United States Patent
Weng et al.

(10) Patent No.: US 8,630,643 B2
(45) Date of Patent: Jan. 14, 2014

(54) METHOD AND SYSTEM FOR FREQUENCY SCAN USING AN ADAPTIVE MEASUREMENT INTERVAL

(75) Inventors: Jianfeng Weng, Kanata (CA); Jason Robert Duggan, Ottawa (CA); Timothy James Creasy, Ottawa (CA)

(73) Assignee: BlackBerry Limited, Waterloo (CA)

( * ) Notice: Subject to any disclaimer, the term of this patent is extended or adjusted under 35 U.S.C. 154(b) by 50 days.

(21) Appl. No.: 13/180,027

(22) Filed: Jul. 11, 2011

(65) Prior Publication Data

US 2013/0017828 A1    Jan. 17, 2013

(51) Int. Cl.
*H04W 4/00*    (2009.01)

(52) U.S. Cl.
USPC ......... 455/435.2; 455/436; 455/522; 370/331

(58) Field of Classification Search
USPC .................................. 455/435.1–3, 436–444
See application file for complete search history.

(56) References Cited

U.S. PATENT DOCUMENTS

| | | | | |
|---|---|---|---|---|
| 2004/0116110 | A1* | 6/2004 | Amerga et al. | ............ 455/422.1 |
| 2005/0068928 | A1 | 3/2005 | Smith et al. | |
| 2010/0279638 | A1 | 11/2010 | Lindoff | |

FOREIGN PATENT DOCUMENTS

| | | |
|---|---|---|
| WO | 2004/010719 A1 | 1/2004 |
| WO | 2009/095369 A1 | 8/2009 |
| WO | 2009/096846 A1 | 8/2009 |

OTHER PUBLICATIONS

Soma, "Mobility Prediction Project", http://lia.deis.unibo.it/Research/SOMA/MobilityPrediction/overview.shtml, 1 page.
Soma, "Mobility and handover prediction mechanism: a performance comparison exploiting several filters", http://lia.deis.unibo.it/Research/SOMA/MobilityPrediction/filters.shtml, 6 pages.
Benetazzo, L. et al., "Enhanced use of RSSI-based wireless network nodes for power measurement purposes", Instrumentation and Measurement Tech. Conf., I2MTC'09, pp. 1037-1042, http://ieeexplore.ieee.org/stamp/stamp.jsp?arnumber=5168606.
Wu, H. et al., "Proactive scan: fast handoff with smart triggers for 802.11 wireless LAN", IEEE Int. Conf. Computer Commun., pp. 749-757, 2007, http://ieeexplore.ieee.org/stamp/stamp.jsp?arnumber=4215675.
Lim, H. et al., "Initial synchronization for WiBro", IEEE Asia-Pacific Conf. Commun., pp. 284-288, Oct. 2005.
Lee, K.M. et al., "An initial cell search scheme robust to frequency error in W-CDMA system", IEEE Int. Symposium Personal, Indoor and Mobile Radio Commun., vol. 2, pp. 1400-1404, Aug. 2002.

(Continued)

*Primary Examiner* — Vladimir Magloire
(74) *Attorney, Agent, or Firm* — Fitch, Even, Tabin & Flannery LLP

(57) ABSTRACT

Aspects of the present application include using adaptive measurement intervals to improve RSSI scan accuracy. A method may involve determining a first power value in respect of a first measurement time interval, determining whether or not the first power value meets at least one criterion, when the first power value does not meet the at least one criterion, determining at least one additional power value, selecting at least one power value from a set of power values that have been determined, the set including the first power value and the at least one additional power value, and determining the power value for use in cell selection or cell re-selection based on the selected at least one power value. The methods may be applied to any cell selection or re-selection scheme for which an adaptive measurement interval may be beneficial.

18 Claims, 13 Drawing Sheets

(56) References Cited

OTHER PUBLICATIONS

Nielsen, A. O. et al., "WCDMA initial cell search", IEEE Vehicular Tech. Conf. Fall, vol. 1, pp. 377-383, 2000.

Li, C. F. et al. "Cell search in WCDMA under large-frequency and clock errors: algorithms to hardware implementation", IEEE Trans. Circuits and Systems, vol. 55. No. 2, pp. 659-671, Mar. 2008.

Rohde-Schwarz application note: "Cell search and cell selection in UMTS LTE", http://www2.rohde-schwarz.com/file_12728/1MA150_0E.pdf, 40 pages.

European Search Report for related European Patent Application No. 11162968.9, dated Sep. 29, 2011, 6 pages.

European Search report for corresponding European Patent Application No. 11173487.7, dated Nov. 16, 2011, 9 pages.

"3GPP TS 36.211 V8.6.0: 3rd Generation Partnership Project; Technical Specification Group Radio Access Network; Evolved Universal Terrestrial Radio Access (E-UTRA); Physical Channels and Modulation (Release 8)", 3GPP TS 36.211 V8.6.0, vol. 36.211, No. V8.6.0, Mar. 1, 2009, URL: http://www.3gpp.org/ftp/Specs/archive/36_series/36.211/, 82 pages.

"3rd Generation Partnership Project; Technical Specification Group Radio Access Network; Evolved Universal Terrestrial Radio Access (E-UTRA); Physical layer; Measurements (Release 9)", 3GPP Standard; 3GPP TS 36.214, 3rd Generation Partnership Project (3GPP), Mobile Competence Centre; No. V9.2.0, Jun. 14, 2010, 14 pages.

* cited by examiner

METHOD AND SYSTEM FOR FREQUENCY SCAN USING AN ADAPTIVE MEASUREMENT INTERVAL

TECHNICAL FIELD

The application relates to cell selection and re-selection using an adaptive measurement interval based frequency scan.

BACKGROUND

Initial cell selection is a procedure for a wireless device to determine the presence of a wireless network and find a suitable cell via which to access the network. In the initial cell selection, the wireless device scans a list of possible carrier frequencies of configured operating bands, searches for the cell with the strongest signal strength, finds a cell identification number for the cell with the strongest signal strength, and detects the channel bandwidth and other broadcast information, such as a public land mobile network (PLMN) identification number for that cell. Having found a suitable cell via which to access the network, the wireless device also needs to regularly perform a cell reselection procedure to search for a potentially better cell, which may use a different frequency, via which to access the network. The time required for initial cell selection impacts the end user experience. The time for cell reselection in particular is an important contributing factor to the power consumption of a wireless device.

To speed up the carrier frequency scan, a received signal strength indicator (RSSI) based carrier frequency scan may be employed and the carrier frequencies with strong RSSIs are identified for further cell identification. However, an RSSI scan with a fixed measurement interval may not be effective in determining the signal strength if the measurement interval does not capture the downlink signal with sufficient power. This may happen when a wireless network has no downlink transmission during a portion of the transmission resource designated for uplink transmission in Time-Division Duplex mode, during a portion of the transmission resource designated for Multimedia Broadcast-Multicast Service Single Frequency Network (MBSFN) transmission, but with no MBSFN traffic at that time, or when a weak downlink signal is detected due to propagation loss or deep fading. Conventional approaches for addressing the problem, such as increasing the fixed measurement interval or performing multiple RSSI scan passes, may increase linearly the RSSI scan time and the battery power consumption for all wireless devices. However, as the inability to detect sufficient power occurs in certain cases and not all cases, there is no need to increase the fixed measurement interval all the time.

BRIEF DESCRIPTION OF THE DRAWINGS

Embodiments of the application will now be described with reference to the attached drawings in which.

DETAILED DESCRIPTION

Figure 1:
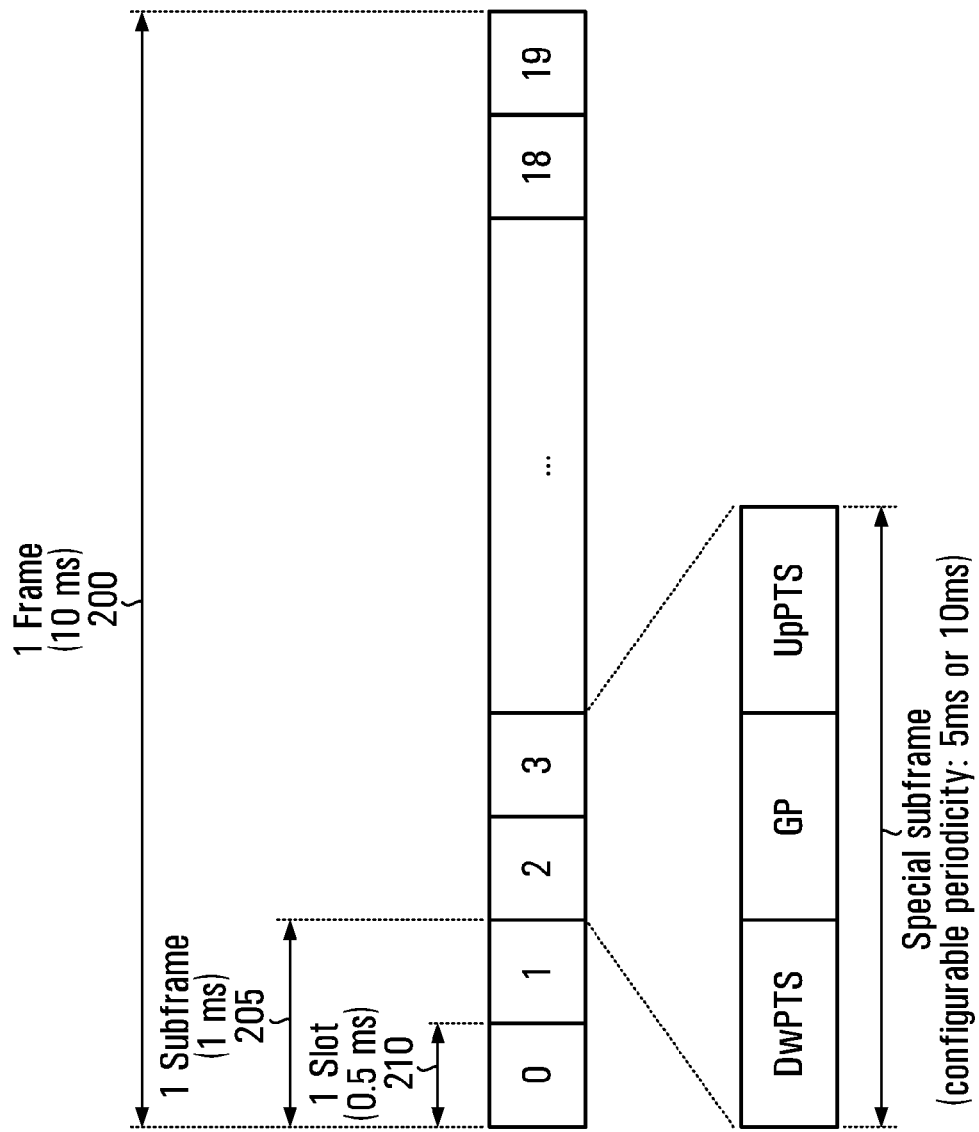
FIG. 1 is a schematic diagram of an example frame structure for Evolved UMTS Terrestrial Radio Access Network (E-UTRA) in a Time Division Duplex (TDD) mode.

In accordance with an aspect of the application, there is provided a method of determining a power value for use in cell selection or cell re-selection, the method comprising: determining a first power value in respect of a first measurement time interval; determining whether or not the first power value meets at least one criterion; when the first power value does not meet the at least one criterion, determining at least one additional power value; selecting at least one power value from a set of power values that have been determined, the set including the at least one additional power value; determining the power value for use in cell selection or cell re-selection based on the selected at least one power value.

In some embodiments selecting at least one power value comprises: if there is a power value of the at least one additional power value that satisfies the at least one criterion, selecting at least that power value, in which case the power value for use in cell selection or cell re-selection is set to the power value of the at least one additional power value that satisfies the at least one criterion.

In some embodiments selecting at least one power value further comprises: determining a maximum power value from the set of power values that have been determined.

In some embodiments selecting at least one power value further comprises: generating a subset of the set of power values by selecting for inclusion in the subset the maximum power value and any power values of the set of power values that are within a specified range of the maximum power value of the set of power values.

In some embodiments determining the power value for use in cell selection and cell re-selection comprises determining an average power value from the subset of the set of power values.

In some embodiments determining at least one additional power value comprises determining at least one additional power value until either one of: a current additional power value meets the at least one criterion; or a maximum number of repetitions of determining at least one additional power value have been performed.

In some embodiments determining a power value is performed for each of one or more of a plurality of candidate carrier frequencies.

In some embodiments determining a power value is performed for each of one or more channel hypothesis associated with at least one of the plurality of candidate carrier frequencies.

In some embodiments determining the power value for use in cell selection or cell re-selection based on the selected at least one power value comprises: for each of a plurality of channel hypotheses, determining a metric based on the selected at least one power value; and based on the metrics determined for the plurality of channel hypotheses, selecting at least one channel hypothesis for further processing for cell selection or cell re-selection.

In some embodiments selecting the at least one channel hypothesis for further processing comprises: arranging the metrics determined for the plurality of channel hypotheses according to order of magnitude and selecting $N_f$ metrics, where $N_f \geq 1$, each associated with a channel hypothesis based on the largest magnitude metrics; and selecting at least one of the $N_f$ channel hypotheses for further processing based on a largest magnitude metric.

In some embodiments determining a first power value in respect of a first measurement time interval comprises: determining the first power value in respect of a first measurement time interval for each of at least one channel hypothesis.

In some embodiments determining a first power value in respect of a first measurement time interval comprises: for each of a plurality of candidate carrier frequencies: determining a first metric in respect of a power measurement of a first measurement time interval; and determining a second metric in respect of the power measurement of the first measurement time interval.

In some embodiments the method further comprises: for the plurality of candidate carrier frequencies: arranging the second metrics, each associated with a respective candidate carrier frequency, in order of magnitude and selecting $N_S$, where $N_S \geq 1$, largest second metrics; and wherein determining whether or not the first power value meets at least one criterion comprises: for each of the $N_S$ candidate carrier frequencies associated with the second metrics, determining whether a first metric associated with the same candidate carrier frequency meets at least one criterion.

In some embodiments determining whether the first metric meets at least one criterion comprises: for each of the $N_s$ candidate carrier frequencies: when the first metric does not meet the at least one criterion; determining at least one additional power measurement; and wherein selecting at least one power value from a set of power values that have been determined comprises: recalculating the first and second metrics based upon the power measurement of the first measured time interval and the at least one additional power measurement.

In some embodiments determining the power value for use in cell selection or cell re-selection based on the selected at least one power value comprises: re-arranging all of the second metrics, including original and re-calculated metrics, in order of magnitude and selecting the $N_S$, where $N_S \geq 1$, largest second metrics; for each of the $N_S$ candidate carrier frequencies associated with the second metrics, determining whether a first metric associated with the same candidate carrier frequency meets at least one criterion.

In some embodiments the method further comprises: arranging the candidate carrier frequencies associated with the at least $N_s$ second metrics in order of magnitude and selecting $N_f$ metrics, where $N_f \geq 1$, based on the largest magnitude second metrics; and selecting at least one of the $N_f$ candidate carrier frequencies for further processing.

In some embodiments determining the first and second metrics is performed for a plurality of channel hypotheses associated with at least one of the plurality of candidate carrier frequencies.

In some embodiments determining whether or not the first power value meets the at least one criterion comprises: for each of the at least one channel hypothesis: each channel hypothesis having a hypothetical occupied portion and a hypothetical guard band portion, determining the first metric based on the power measurement and the at least one additional power measurement of the hypothetical occupied portion; calculating the second metric based on a difference between the power measurement and the at least one additional power measurement of the hypothetical occupied portion and a power measurement and at least one additional power measurement of the hypothetical guard band portion.

In some embodiments re-calculating the first and second metrics comprises: re-calculating the first and second metrics based upon a power value based upon a maximum power value determined from a set of power measurements including the power measurement value of a first measurement time interval and the at least one additional power measurement.

In accordance with another aspect of the application, there is provided a wireless device comprising: a processor; an adaptive measurement interval function configured to: determine a first power value in respect of a first measurement time interval; determine whether or not the first power value meets at least one criterion; when the first power value does not meet the at least one criterion, determine at least one additional power value; select at least one power value from a set of power values that have been determined, the set including the at least one additional power value; determine the power value for use in cell selection or cell re-selection based on the selected at least one power value.

In some embodiments select at least one power value comprises: if there is a power value of the at least one additional power value that satisfies the at least one criterion, select at least that power value, in which case the power value for use in cell selection or cell re-selection is set to the power value of the at least one additional power value that satisfies the at least one criterion.

In some embodiments select at least one power value further comprises: determine a maximum power value from the set of power values that have been determined.

In some embodiments select at least one power value further comprises: generate a subset of the set of power values by selecting for inclusion in the subset the maximum power value and any power values of the set of power values that are within a specified range of the maximum power value of the set of power values.

In some embodiments determine the power value for use in cell selection and cell re-selection comprises determine an average power value from the subset of the set of power values.

In some embodiments determine at least one additional power value comprises determine at least one additional power value until either one of: a current additional power value meets the at least one criterion; or a maximum number of repetitions of determining at least one additional power value have been performed.

In some embodiments determine a power value is performed for each of one or more of a plurality of candidate carrier frequencies.

In some embodiments determine a power value is performed for each of one or more channel hypothesis associated with at least one of the plurality of candidate carrier frequencies.

In some embodiments determine the power value for use in cell selection or cell re-selection based on the selected at least one power value comprises: for each of a plurality of channel hypotheses, determine a metric based on the selected at least one power value; and based on the metrics determined for the plurality of channel hypotheses, select at least one channel hypothesis for further processing for cell selection or cell re-selection.

In some embodiments select the at least one channel hypothesis for further processing comprises: arrange the metrics determined for the plurality of channel hypotheses according to order of magnitude and select $N_f$ metrics, where $N_f \geq 1$, each associated with a channel hypothesis based on the largest magnitude metrics; and select at least one of the $N_f$ channel hypotheses for further processing based on a largest magnitude metric.

In some embodiments determine a first power value in respect of a first measurement time interval comprises: determine the first power value in respect of a first measurement time interval for each of at least one channel hypothesis.

In some embodiments determine a first power value in respect of a first measurement time interval comprises: for each of a plurality of candidate carrier frequencies: determine a first metric in respect of a power measurement of a first measurement time interval; and determine a second metric in respect of the power measurement of the first measurement time interval.

In some embodiments the adaptive measurement interval function is further configured to: for the plurality of candidate carrier frequencies: arrange the second metrics, each associated with a respective candidate carrier frequency, in order of magnitude and selecting $N_S$, where $N_S \geq 1$, largest second metrics; and wherein determine whether or not the first power value meets at least one criterion comprises: for each of the $N_s$ candidate carrier frequencies associated with the second metrics, determine whether a first metric associated with the same candidate carrier frequency meets at least one criterion.

In some embodiments determine whether the first metric meets at least one criterion comprises: for each of the $N_s$ candidate carrier frequencies: when the first metric does not meet the at least one criterion; determine at least one additional power measurement; and wherein selecting at least one power value from a set of power values that have been determined comprises: recalculate the first and second metrics based upon the power measurement of the first measured time interval and the at least one additional power measurement.

In some embodiments determine the power value for use in cell selection or cell re-selection based on the selected at least one power value comprises: re-arrange all of the second metrics, including original and re-calculated metrics, in order of magnitude and select the $N_S$, where $N_S \geq 1$, largest second metrics; for each of the $N_S$ candidate carrier frequencies associated with the second metrics, determine whether a first metric associated with the same candidate carrier frequency meets at least one criterion.

In some embodiments the adaptive measurement interval function is further configured to: arrange the candidate carrier frequencies associated with the at least $N_s$ second metrics in order of magnitude and select $N_f$ metrics, where $N_f \geq 1$, based on the largest magnitude second metrics; and select at least one of the $N_f$ candidate carrier frequencies for further processing.

In some embodiments determine the first and second metrics is performed for a plurality of channel hypotheses associated with at least one of the plurality of candidate carrier frequencies.

In some embodiments determine whether or not the first power value meets the at least one criterion comprises: for each of the at least one channel hypothesis: each channel hypothesis having a hypothetical occupied portion and a hypothetical guard band portion, determine the first metric based on the power measurement and the at least one additional power measurement of the hypothetical occupied portion; calculate the second metric based on a difference between the power measurement and the at least one additional power measurement of the hypothetical occupied portion and a power measurement and at least one additional power measurement of the hypothetical guard band portion.

In some embodiments re-calculate the first and second metrics comprises: re-calculate the first and second metrics based upon a power value based upon a maximum power value determined from a set of power measurements including the power measurement value of a first measurement time interval and the at least one additional power measurement.

In accordance with yet another aspect of the application, there is provided a computer-readable medium having stored thereon computer executable instructions that when executed provide an adaptive measurement interval function configured to: determine a first power value in respect of a first measurement time interval; determine whether or not the first power value meets at least one criterion; when the first power value does not meet the at least one criterion, determine at least one additional power value; select at least one power value from a set of power values that have been determined, the set including the at least one additional power value; determine the power value for use in cell selection or cell re-selection based on the selected at least one power value.

Many of the example embodiments described herein pertain to E-UTRA (Release 8). However, solutions described herein may be applicable to any radio access technology where some form of initial cell search in an operating band with multiple channels and multiple channel bandwidths is utilized. As such, the solutions would be applicable to, but not limited to, technologies such as: LTE/E-UTRA; WiMAX; WCDMA; and CDMA. Furthermore, while many of the examples described herein pertain to wireless devices, either fixed or mobile, the subject matter described herein may also be equally applicable to some forms of wireline communications.

While reference is made below to an E-UTRA user equipment (UE) or device, it is to be considered that more generally a UE can be a wireless communication device that is compatible with any wireless communication system. The UE may be, but is not limited to, a fixed or mobile wireless terminal, a cellular telephone, a wirelessly enabled computer, a wirelessly enabled gaming machine or a personal data assistant (PDA).

In an RSSI scan, a measurement interval for the power measurement at each carrier frequency is typically a fixed interval. In E-UTRA, a measurement interval may be set to a long duration or alternatively several scan passes may be used to account for a weak signal situation, such as users at a cell edge, and for the possible presence of uplink transmission subframes in a time-division duplex (TDD) network, and/or Multimedia Broadcast-Multicast Service Single Frequency Network (MBSFN) subframes without MBSFN traffic. Such practices will increase linearly the frequency scan time for each possible carrier frequency.

E-UTRA supports both frequency division duplex (FDD) and TDD modes. An example of an E-UTRA frame structure in TDD mode is shown in FIG. 1. In the particular implementation illustrated in FIG. 1, a frame 200 is 10 ms long. Within the frame 200, there are 10 subframes 205 each having two slots, an example slot being identified by reference number 210. Within each slot 210 (not shown), there are a defined number of symbols. In some embodiments a slot in a normal cyclic prefix (CP) mode includes 7 OFDM symbols. In some embodiments a slot in an extended CP mode includes 6 OFDM symbols.

More generally, the duration of the frame, the number of subframes per frame, the number of slots per subframe and the number of symbols per slot are implementation specific.

FIG. 1 illustrates a frame structure for a single frame, however it is to be understood that such a frame is one frame of a series of frames that is transmitted in communications between the network and UEs.

In the TDD frame structure there are designated subframes for downlink (DL) and uplink (UL) transmission. In addition, the frame structure may include special subframes specifically defined for backward compatibility of time-division synchronous code division multiple access (TD-SCDMA).

In a particular implementation the special subframe has three portions: a downlink pilot time slot (DwPTS) used for defining information pertaining to a downlink transmission from a wireless network, a guard period (GP) used for defining a time interval pertaining to transmission/reception switching between a downlink transmission and an uplink reception, and an uplink pilot time slot (UpPTS) used for defining information pertaining to an uplink reception at the wireless network. The length of each portion is configurable. Transmission of the special subframe has an implementation specific periodicity within the frame or over a series of one or more frames. With reference to the example of FIG. 1 an example of the periodicity of the special subframe may be 5 ms or 10 ms, i.e. subframe 1 (slot 2 and 3) of the 10 subframes forming the frame 200 and subframe 6 (slot 12 and 13, not shown) of the subframes forming the frame 200 may be the special subframe. More generally, the periodicity of the special subframe is implementation specific.

Subframes may be explicitly designated for either DL or UL transmission. In a particular implementation in which the frame structure has 10 subframes, subframes 0 and 5 are reserved for DL transmission as those two subframes are configured to carry a synchronization signal used for cell identification. In some implementations, subframes immediately following the special subframes are reserved for uplink transmission. Other subframes of the frame can be configured for either DL or UL transmission. It is to be understood that the designation of subframes, for DL, UL and special subframe are implementation specific and may vary from the particular implementation described above.

E-UTRA supports six different channel bandwidths. A list of supported channel bandwidths and the transmission bandwidth configuration NRB (number of resource blocks) are tabulated in Table 1 below. In Table 1, "Channel bandwidth" is the size (in frequency) of a channel including portions that can be occupied and portions that act as guard bands, "Transmission bandwidth configuration NRB" is the maximum number of resource blocks in the occupied portion of the transmission bandwidth, and "Transmission bandwidth" is a portion of the Channel bandwidth that can be occupied, up to a maximum of the Channel bandwidth minus any guard band portions. The contents of Table 1 are purely an exemplary list of bandwidths and it is to be understood that the methodologies described herein could apply to any reasonable number and size of bandwidths with distinct bandwidth values.

In a particular implementation of E-UTRA a resource block (RB) is a block of 12 consecutive subcarriers over one time slot. More generally, an RB is a group of physically adjacent subcarriers over a certain time period. For example in E-UTRA one time slot equals 0.5 ms. Further details on the definition of RB and subcarriers for a given implementation can be found in 3GPP TS 36.211 "$3^{rd}$ Generation Partnership Project; Technical Specification Group Radio Access Network; Evolved Universal Terrestrial Radio Access (E-UTRA); Physical channels and modulation (Release 8)". In some embodiments, which may or may not be E-UTRA compatible, it may be possible that the carriers are logically grouped carriers, some of which may be physically adjacent and others that are not.

TABLE 1

E-UTRA channel bandwidths and transmission bandwidth configuration NRB

| | Channel bandwidth BWChannel (MHz) | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |
| Transmission bandwidth (MHz) | 1.08 | 2.7 | 4.5 | 9 | 13.5 | 18 |

Figure 2:
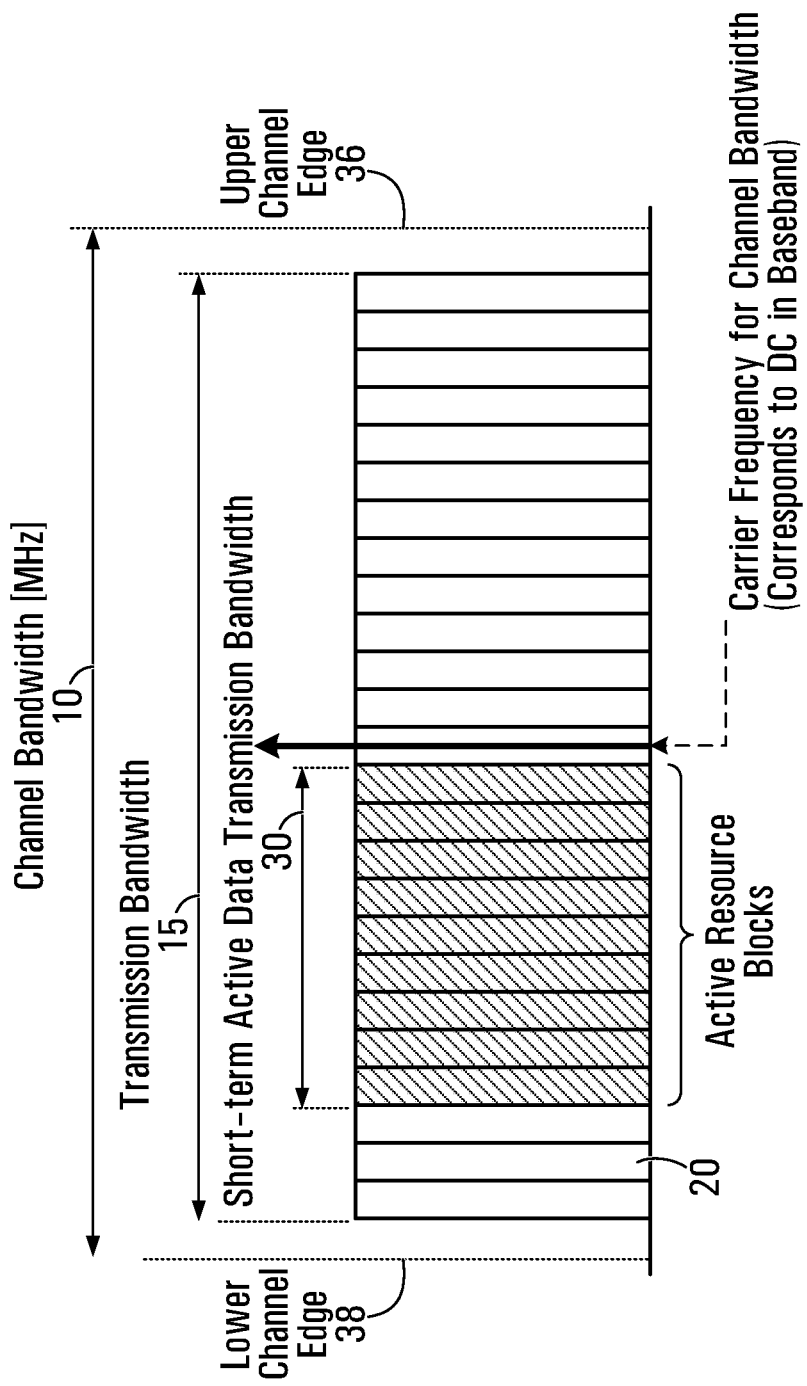
FIG. 2 is a schematic diagram of an example E-UTRA carrier.

With reference to FIG. 2, a relation between channel bandwidth (in MHz) 10 and transmission bandwidth configuration 15 in number of RBs is shown in FIG. 2. FIG. 2 is a particular example that illustrates twenty-five resource blocks in an occupied portion of the channel bandwidth 10, an exemplary RB is indicated by reference number 20. In FIG. 2, nine of the resource blocks are illustrated as active resource blocks that make up a short-term active data transmission bandwidth 30. In FIG. 2 the short-term active data transmission bandwidth 30 is not the maximum transmission bandwidth that would be possible, i.e. all twenty-five resource blocks. More generally, it is to be understood that anywhere from zero to the total number of resource blocks defined by the transmission bandwidth configuration NRB value could be active resource blocks in any given time slot (0.5 ms). Upper 36 and lower 38 channel edges define the edges of the channel bandwidth 10. In this example, all 25 RBs will contain reference signals (RS) and thus will contribute to an RSSI measurement. The nine active resource blocks that make up the short-term active data transmission bandwidth 30 are resource blocks that carry data in addition to the RS. In LTE downlink the number of active RBs can change as frequently as every subframe (1 ms) and the location of the active RBs within the transmission bandwidth 15 can change as frequently as every time slot (0.5 ms).

E-UTRA is designed to operate in various operating bands from 700 MHz to 2.6 GHz as specified in 3GPP TS 36.101 "$3^{rd}$ Generation Partnership Project; Technical Specification Group Radio Access Network; Evolved Universal Terrestrial Radio Access (E-UTRA); User Equipment (UE) radio transmission and reception (Release 8)". The bandwidths of those operating bands may vary from 10 MHz to 100 MHz.

Within an operating band, different channel bandwidths can be used. In some implementations, each channel has a carrier frequency that is constrained to be an integer multiple of the E-UTRA channel frequency raster (100 kHz) for all operating bands. The carrier frequency is designated by the E-UTRA Absolute Radio Frequency Channel Number (EARFCN). The E-UTRA channel numbers can be found in 3GPP TS 36.101 "$3^{rd}$ Generation Partnership Project; Technical Specification Group Radio Access Network; Evolved Universal Terrestrial Radio Access (E-UTRA); User Equipment (UE) radio transmission and reception (Release 8)".

Figure 3:
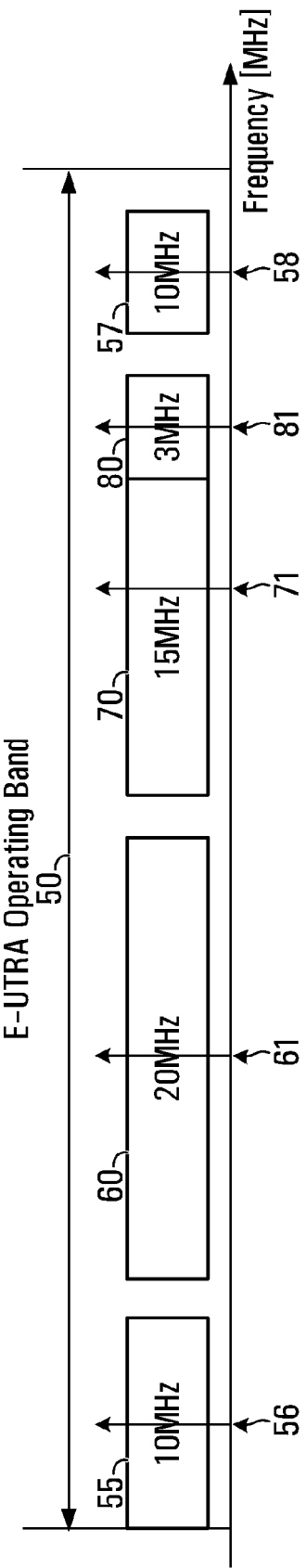
FIG. 3 is a schematic diagram of an example combination of different channel bandwidths in a single operating band.

FIG. 3 illustrates an exemplary E-UTRA operating band 50 divided into multiple channels. Shown within the operating band 50 is a first 10 MHz channel 55 having a carrier frequency 56, a 20 MHz channel 60 having a carrier frequency 61, a 15 MHz channel 70 having a carrier frequency 71, a 3 MHz channel 80 having a carrier frequency 81 and a second 10 MHz channel 57 having a carrier frequency 58. There are also gaps between some of the channels illustrated in FIG. 3. The gaps are not indicated to be of a particular size in FIG. 3. In the particular example of FIG. 3 the carrier frequencies are integer multiples of a frequency raster, which in E-UTRA is 100 kHz. It is to be understood that while the carrier frequencies in the example of FIG. 3 are standard specific, the carrier frequencies may be any desirable value.

More generally, an operating band may include any combination of channel bandwidths having associated carrier frequencies that fit within the operating band. There may be more than one of the same size channel bandwidths in the operating band. There may be none of a particular size channel bandwidth of a group of different size channel bandwidths in the operating band; that is, not all of the known sizes of the different size channel bandwidths will necessarily be included in an operating band. The size and configuration of channel bandwidths in an operating band are deployment specific. In addition, the number and size of gaps which may occur between channels within the operating band or between channels and the operating band edge are deployment specific.

A telecommunication cell may transmit a set of synchronization signals, such as primary synchronization signal (PSS) and secondary synchronization signal (SSS), which are broadcast within the configured transmission band on a regular basis. Such synchronization signals can be used by a wireless device when performing cell selection and re-selection.

A telecommunication cell may transmit a set of cell specific reference signals (RS), which are broadcast within the configured transmission band on a regular basis. Such reference signals may aid in the identification of the telecommunication cell. In some implementations, the RS transmission may be suppressed for some subframes, such as certain TDD or MBSFN subframes, or portions thereof.

The reference signals are scattered over a two-dimensional transmission resource grid having a time dimension and a frequency dimension. In the frequency dimension, the two-dimensional transmission resource is formed of subcarriers. The number of subcarriers and subcarrier spacing are deployment specific.

In the time dimension, the two-dimensional resource is divided into frames, subframes, slots and symbols. Within each subframe, a subset of resource elements (RE) are selected to carry the reference signals. As an example one RE may refer to a time/frequency location of the two-dimensional transmission resource made up of one OFDM symbol in the time dimension and one subcarrier in the frequency dimension. In some implementations of E-UTRA, several OFDM symbols within one subframe and one out of every six subcarriers within the selected OFDM symbol are used to carry the reference signals.

When an E-UTRA user equipment (UE) is powered on, the UE needs to perform an initial cell selection to find a suitable cell via which to access the network. Subsequent to the initial cell selection, the device needs to regularly perform cell re-selection to search for a potentially better cell to camp on. In both the initial cell selection and the cell re-selection, the device may scan a list of the candidate carrier frequencies, searching for the cell with adequate reception level, and determining its cell identification number. The device may perform a synchronization signal detection based on, for example, the cell identification number for the cell.

Prior to accessing a cellular network, a UE may not have reliable information about the carrier frequencies of the cells in its vicinity. Furthermore, in systems such as E-UTRA where the channel bandwidth is not fixed, the channel bandwidth of each cell may also be unknown to the UE. As such, every possible carrier frequency as designated by E-UTRA within the bands supported by the UE is a candidate for cell selection or re-selection.

In addition, UEs may not have reliable information of the duplex mode, either TDD or FDD, or reliable information of frame boundary timing. If the LTE base station (eNB) is in TDD mode and a UE's measurement interval is not long enough, the UE might measure the power of the subframes designated for the UL transmission and may not capture any power of the DL signal, which would result in a measurement that is not representative of the received power level of downlink signals.

E-UTRA also defines MBSFN subframes for broadcast multicast service delivery, and which may be exploited for other purposes in later releases. The number of OFDM symbols for a Physical Downlink Control Channel (PDCCH) in the MBSFN subframes could be 0, 1, or 2. In E-UTRA, within a given radio frame for a particular implementation, subframes 0, 4, 5, and 9 are non-MBSFN subframes, while subframes 1, 2, 3, 6, 7, and/or 8 may be configured as MBSFN subframes. For MBSFN subframes, however, when there is no downlink traffic, the signal power in those MBSFN subframes will be very small or even zero. UEs without reliable information of the location of the MBSFN subframes in a frame may have difficulty in measuring the DL signal power if the power measurement interval being used is not long enough.

One possible carrier frequency scan approach is an exhaustive scan, which involves a search for an E-UTRA downlink synchronization signal, i.e., PSS and SSS, at all possible carrier frequencies. Normally, the exhaustive scan can be computationally expensive and time consuming. One way to circumvent that is to do a received signal strength indicator (RSSI) frequency scan first and select the carrier frequency candidates with the strongest RSSI for further cell identification and detection of synchronization signals. An example of the RSSI scan procedure is discussed in further detail with reference to FIG. 4.

Figure 4:
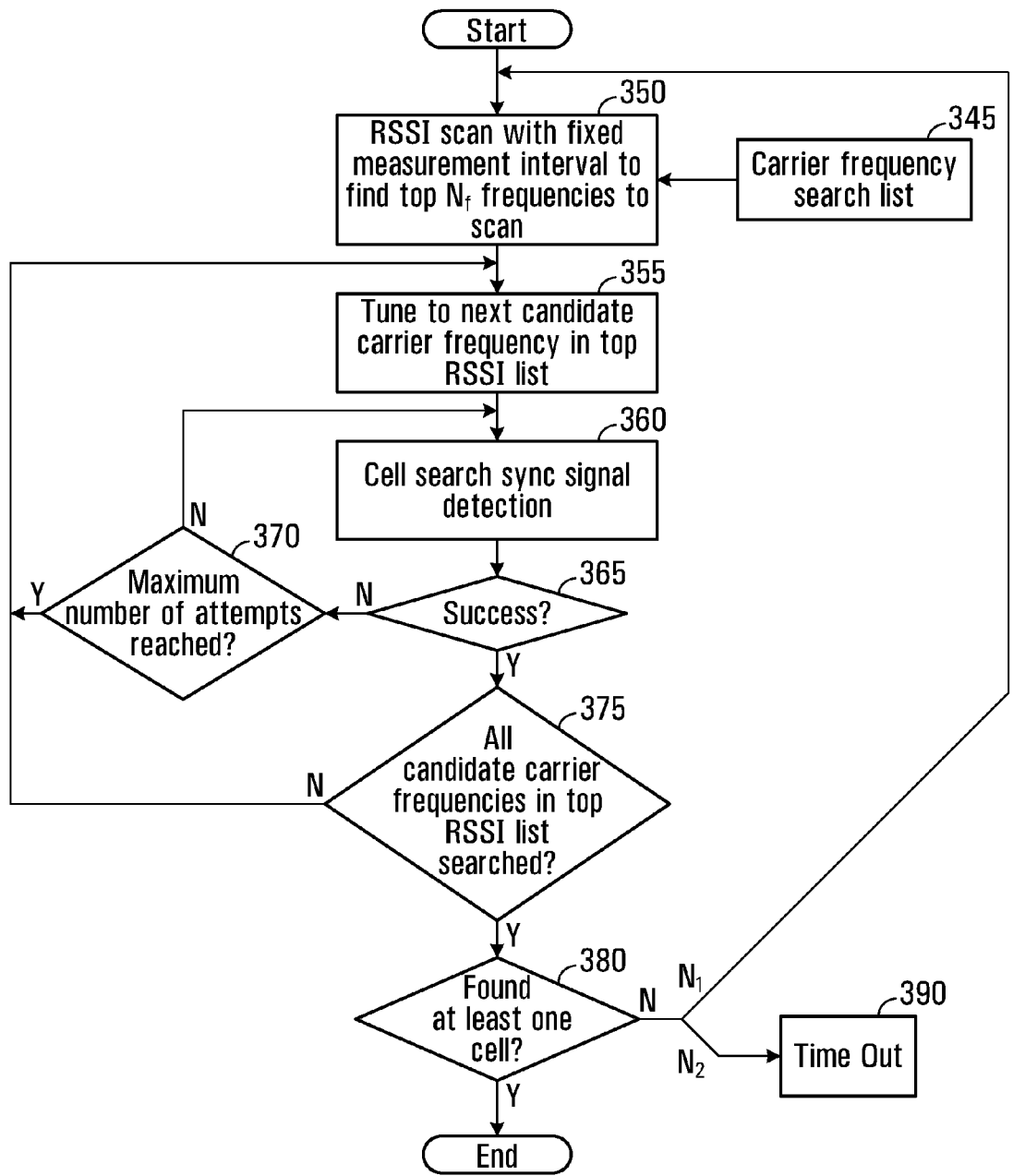
FIG. 4 is a flow chart illustrating a method for an RSSI frequency scan approach.

Referring to FIG. 4, steps for the conventional RSSI scan include a first step 350 illustrated in the flow chart that involves performing an RSSI scan for all candidate carrier frequencies in the operating band to find the top $N_f$ frequencies to search, namely the $N_f$ carrier frequencies having the strongest signal strengths. A list of candidate carrier frequencies on which to perform the RSSI scan may be received from a carrier frequency search list 345. A next step 355 illustrated in the flow chart involves tuning to a next carrier frequency, which then becomes the current candidate carrier frequency, in the top $N_f$ frequencies list (hereafter referred to as the "RSSI list"). A further step 360 involves performing a cell search to detect a synchronization signal for the current candidate carrier frequency. Step 365 includes determining if the cell search is successful for the current candidate carrier frequency. If the cell search is unsuccessful, "N" path of step 365, the method proceeds to step 370. Step 370 includes determining if a maximum number of attempts have been reached for identifying a cell on the current candidate carrier frequency. If the maximum number of attempts has been reached, "Y" path of step 370, the method proceeds to step 355 to tune to the next candidate carrier frequency of the RSSI list and continues until all candidate carrier frequencies are checked. If the maximum number of attempts has not been reached, "N" path of step 370, the method proceeds to step 360 to perform another attempt at the cell search to detect a synchronization signal for the current candidate carrier frequency.

If the cell search for the current candidate carrier frequency cell is successful, "Y" path of step 365, the method proceeds to step 375. At step 375 a determination is made as to whether all of the candidate carrier frequencies of the RSSI list are checked. If all of the carrier frequencies of the RSSI list are not checked, "N" path of step of 375, the method returns to step 355 to tune to the next candidate carrier frequency in the RSSI list and continues the method until all candidate carrier frequencies are checked. If all of the carrier frequencies of the RSSI list are checked, "Y" path of step of 375, the method proceeds to step 380. Step 380 is a determination step to determine if at least one cell has been found in the RSSI list of candidate carrier frequencies. If at least one cell has not been found in the RSSI list of candidate carrier frequencies, "N" path of block 380, there are multiple possible paths. In a first path, N1, the method may return to step 350 to perform a new RSSI scan to find the top $N_f$ frequencies to scan. In a second path, N2, the UE may "time out" 390 until an appropriate trigger initiates the scan at a subsequent time. If at least one cell has been found in the RSSI list of candidate carrier frequencies, "Y" path of block 380, the method may be completed. However, it may be possible to perform a new RSSI scan to find the top $N_f$ frequencies to scan if more than one cell is desired.

In addition, it may be possible to stop the method at any time if a particular cell is found with an adequate signal level.

The RSSI scan is an efficient yet effective means for the UE to acquire the network and find a suitable cell via which to access the network. In some implementations the measurement interval for a power measurement in the RSSI scan at each candidate carrier frequency is fixed. A fixed measurement interval may be problematic in the following scenarios.

In TDD mode as UEs may not have reliable information pertaining to the DL frame boundary the measurement interval may overlap with one or more UL or special subframes and consequently may not be able to capture an appropriate power measurement of the DL signal.

With regard to MBSFN subframes, UEs without reliable information pertaining to the location of the MBSFN subframes may not be able to capture an appropriate power measurement if the measurement interval overlaps with the MBSFN subframes and when there is no traffic in the MBSFN subframes.

When a UE is near an edge boundary of a cell or when a UE experiences deep fading, a received signal is weak and the signal power level may be submerged below the thermal noise power level (also known as thermal noise floor) of the receiver. Thermal noise is electronic noise generated by thermal agitation of charge carriers (usually electrons) inside an electrical conductor at equilibrium. As a result, the power measurement of the received signal will likely be noisy and inaccurate.

If the RSSI measurement interval does not capture the DL signal with a sufficient power or the measured RSSIs are noisy, it may miss the correct candidate carrier frequency on which to perform a cell search and may be difficult to find an appropriate cell. To resolve such a difficulty, two typical approaches include a first approach of setting a large measurement interval in the RSSI scan and a second approach of setting a small measurement interval in the RSSI scan, but performing multiple passes. The power measurements from multiple passes can then be averaged.

Unfortunately, both of these approaches have drawbacks. The first approach may increase the power measurement scan time for each possible carrier frequency. The second approach may waste time in the synchronization signal detection from the candidate carrier frequencies.

In E-UTRA, the time location and sequence number of a synchronization signal of any cell may be unknown a priori to a wireless device when it begins searching for a cell. As the synchronization signal has a particular periodicity in the transmitted signal, for example 5 ms, in order to detect the synchronization signal the wireless device needs to search over a time duration of at least the periodicity for the presence of the synchronization signal. For example, when the periodicity is 5 ms, synchronization signal detection for each candidate carrier frequency might need 5 ms or more. If a current search misses a location of sync signal, another location of sync signal should occur within the next 5 ms. Otherwise, the sync signal detection could be shorter.

In U.S. application Ser. No. 13/089,866 an alternative manner of post processing is performed that includes evaluating, for each of multiple channel hypotheses, each hypothesis defining a hypothetical occupied portion and a hypothetical guard band portion, a difference between a power value in the hypothetical occupied portion and a power value in the hypothetical guard band portion. Evaluating the difference between the power value in the hypothetical occupied portion and the power value in the hypothetical guard band portion as part of the RSSI scan will be referred to as a differential RSSI scan.

There are various ways of obtaining the power values for the hypothetical occupied portion and the hypothetical guard band portion. Two examples will be described in further detail below.

In the first example, the received power within frequency bins is determined across an operating band using a narrow band filter. The frequency bins collectively form the hypothetical occupied portion and hypothetical guard band portion of the hypothetical channels. For each of the channel hypotheses, an RSSI difference is calculated between the hypothetical occupied portion and the hypothetical guard band portion.

In the second example, for an operating band having a bandwidth, a wideband filter having a filter bandwidth that is equal to or less than the operating band bandwidth filters a received signal. For each filtered signal Fourier Transform (FT) processing is performed and results in power values at a plurality of frequency bins with a resolution equal or less than a standard specific frequency raster. Two particular examples of Fourier Transform processing include a discrete Fourier transform and a Fast Fourier Transform (FFT). In some embodiments, a bank of fixed bandwidth filters could be used such that the fixed bandwidths are equal to the size of the frequency bins and each filter enables determination of a power for its respective bandwidth and collectively the bank of filters cover all or a desired portion of the operating band. The power values of frequency bins can then be used to determine power values for the hypothetical occupied portions and power values for the hypothetical guard band portions of the respective channel hypotheses. For each of the channel hypotheses, an RSSI difference is calculated between the hypothetical occupied portion and the hypothetical guard band portion.

In some embodiments the RSSI difference calculation that is performed for the wideband filter and Fourier Transform processing is the same as that in the differential RSSI scan with a narrowband filter except that the power measurements that are used for the calculations are from the output from a device capable of determining a power spectrum, such as for example, a power spectrum analyzer.

In some embodiments the RSSI difference is the difference in power per frequency bin between the hypothetical occupied portion and the hypothetical guard band portion for a particular channel hypothesis. The RSSI difference at candidate carrier frequency $f_k$ for a channel hypothesis $B_m$ is determined as follows:

$$RSSI_{diff}(f_k, B_m) = \frac{P_{occupiedband}(f_k, B_m)}{N_{occupiedband}(f_k, B_m)}(dB) - \frac{P_{guardband}(f_k, B_m)}{N_{guardband}(f_k, B_m)}(dB). \quad (1)$$

$P_{occupiedband}$ ($f_k$, $B_m$) is the power measured within the hypothetical occupied portion. $P_{guardband}$ ($f_k$, $B_m$) is the power measured within the hypothetical guard band portion. $N_{occupiedband}$ ($f_k$, $B_m$) and $N_{guardband}$ ($f_k$, $B_m$) are the numbers of frequency bins used in the power measurements in the hypothetical occupied portion and the hypothetical guard band portion, respectively. Here, the guard band portion includes both the left guard band and the right guard band, if the power measurements for those two guard bands are available.

The RSSI difference for a given channel hypothesis when calculated in logarithmic (decibel, dB) scale is equivalent to the power ratio between the power per frequency bin in the occupied portion and the power per frequency bin in the guard band portion. In some embodiments, the RSSI difference is calculated using a linear scale.

Figure 5:
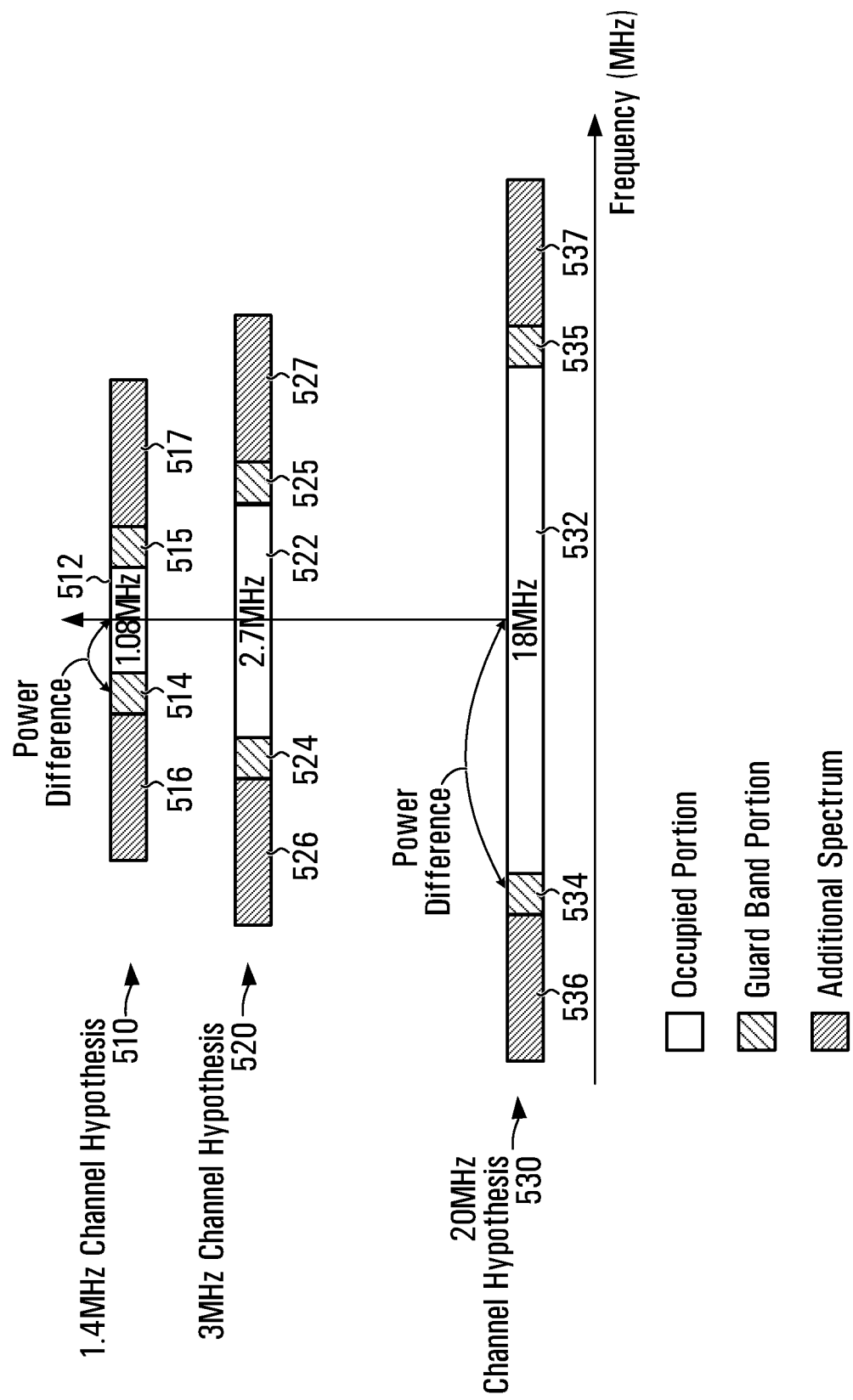
FIG. 5 is a schematic diagram illustrating the occupied band and guard band for several E-UTRA channel bandwidth hypotheses.

For a particular case of E-UTRA, the bandwidths that may be used for different channel hypotheses include 1.4 MHz, 3 MHz, 5 MHz, 10 MHz, 15 MHz, 20 MHz. In a particular implementation, the bandwidth of the occupied portion=transmission bandwidth configuration=NRB*12*0.015 MHz as tabulated in Table 1. More generally, the possible channel bandwidths, the number of subcarriers and the subcarrier frequency spacing are implementation specific, for example specific to a particular standard. Examples of the occupied portion and the guard band portion for E-UTRA channel bandwidth hypotheses are illustrated in FIG. 5. Referring to FIG. 5, shown are several different channel hypotheses including a 1.4 MHz channel hypothesis, a 3 MHz channel hypothesis and a 20 MHz channel hypothesis. The 1.4 MHz channel hypothesis shows a bandwidth 510 of 1.4 MHz, but the maximum occupied portion 512 is only 1.08 MHz. The guard band portions, upper 515 and lower 514, together collectively form the remainder 0.32 MHz of the 1.4 MHz bandwidth. Outside the 1.4 MHz bandwidth is additional spectrum 516,517 for other channels, unused spectrum, or spectrum reserved for other purposes. The power difference for the 1.4 MHz channel hypothesis is determined between the occupied portion 512 and the guard band portions 514,515. The 3 MHz channel hypothesis shows a bandwidth 520 of 3 MHz, but the occupied portion 522 is only 2.7 MHz. The guard band portions, upper 525 and lower 524, together collectively form the remainder 0.3 MHz of the 3 MHz bandwidth. Outside the 3 MHz bandwidth is additional spectrum 526,527 for other channels, unused spectrum, or spectrum reserved for other purposes. The power difference of the 3 MHz channel hypothesis is determined between the occupied portion 522 and the guard band portions 524, 525. The 20 MHz channel hypothesis shows a bandwidth 530 of 20 MHz, but the occupied portion 532 is only 18 MHz. The guard band portions, upper 535 and lower 534, together collectively form the remainder 2 MHz of the 20 MHz bandwidth. Outside the 20 MHz bandwidth is additional spectrum 536,537 for other channels, unused spectrum, or spectrum reserved for other purposes. The power difference of the 20 MHz channel hypothesis is determined between the occupied portion 532 and the guard band portions 534,535.

In some embodiments, during the RSSI scan, at each candidate carrier frequency for which the channel hypotheses of all possible channel bandwidth values, i.e. {$B_m$}, are being determined, the RSSI difference is given by:

$$RSSI_{diff}(f_k) = \max\{RSSI_{diff}(f_k, B_m)\} \quad (2).$$

In equation (2) the $RSSI_{diff}$ value is the maximum difference value of all of the channel hypotheses; i.e., of all possible $B_m$ values, that were determined for candidate carrier frequency $f_k$. When $RSSI_{diff}(f_k)$ is determined, the corresponding channel bandwidth $B_m$, which gives the largest $RSSI_{diff}(f_k, B_m)$, is also the most likely channel bandwidth used at that candidate carrier frequency.

In some embodiments, if at a candidate carrier frequency, candidate carrier frequency $f_k$ for example, the difference between the top two $RSSI_{diff}(f_k, B_m)$ for two different hypothetical channel bandwidths is less than a threshold, it is possible to keep more than one hypothetical channel bandwidth for that candidate carrier frequency.

In LTE, downlink synchronization signals are transmitted within the center 1.08 MHz of a given carrier frequency. That means that a UE does not need to know particular channel bandwidth information to detect an LTE sync signal. Once a cell is found, the UE can read broadcast system information to determine the channel bandwidth being used. Therefore, in some embodiments when a synchronization signal is detected the detected channel bandwidth information is not necessarily passed on as part of further processing of the detected candidate carrier frequency.

In the particular implementation of E-UTRA as described above, the $RSSI_{diff}$ value may be the maximum difference value calculated for channel hypotheses having bandwidths equal to 1.4 MHz, 3 MHz, 5 MHz, 10 MHz, 15 MHz and 20 MHz or the subset of these channel bandwidths applicable to the operating band being scanned.

Normally, different E-UTRA carriers are separated in frequency based on their channel bandwidths as shown in the example of FIG. 3. The nominal channel spacing between two adjacent E-UTRA carriers is (BW1+BW2)/2, where BW1 and BW2 are their respective channel bandwidths. As such, the upper or lower guard bandwidth could be set to half of the difference between the channel bandwidth in MHz and the transmission bandwidth in MHz (see Table 1).

In some deployments the E-UTRA channel spacing may be reduced slightly in order to maximize use of spectrum allocations. This results in an overlap of the guard bands of adjacent channels. In extreme cases, the effective combined guard band between channels may be less than the nominal one-sided guard band. To accommodate such a scenario, the guard band portion used in the metric may be configured to be narrower than the nominal guard band width. In some embodiments, a UE may read broadcast information from the cell on which the UE has camped (the cell by which the UE is accessing the network) to acquire the carrier frequencies of neighbour cells, from which the UE may estimate the frequency location of guard band portions between two adjacent inter-frequency cells and may use the estimated frequency locations of guard band portions in a future differential RSSI scan.

An uncompensated frequency offset at the UE could result in some of the power from the actual occupied portion spilling into the hypothetical guard band portion on one side, thus reducing the measured power difference and the quality of the metric. To mitigate this, in some embodiments the start of each guard band portion may be adjusted by moving it away from the nominal transmission band edge by a margin corresponding to the maximum expected frequency offset.

Aspects of the present application include using adaptive measurement intervals to improve the RSSI scan accuracy. Improving the RSSI scan accuracy may improve the RSSI scan success rate, which in turn can reduce the mean frequency scan time in both the initial cell selection and the cell reselection. This may lead to noticeable battery power savings for the UE.

Methods proposed in this application are applicable to the conventional RSSI scan and the differential RSSI scan described above. More generally, the methods may be applied to any cell selection or re-selection scheme for which an adaptive measurement interval may be beneficial. As part of the cell search, a search for the E-UTRA synchronization signal is conducted at each of the selected set of frequency candidates in order of magnitude of the RSSI metrics.

The basic idea of the proposed methods is to enable a variable duration measurement interval to refine the RSSI measurement when the measurement is considered unreliable. In some embodiments this is done before RSSI metrics are finalized. The RSSI frequency scan with adaptive measurement interval in some embodiments is similar to the RSSI frequency scan described above with regard to FIG. 4, except that the RSSI measurements are refined by the RSSI scan with an adaptive measurement interval. The measurement interval that is used when performing the RSSI scan may be different at different carrier frequency locations. For example, when the detected power level at a given carrier frequency location is low, the measurement interval may be increased to allow a more reliable measurement. If the detected power level at a given carrier frequency location meets desired criteria, then the measurement interval will be short.

Figure 6:
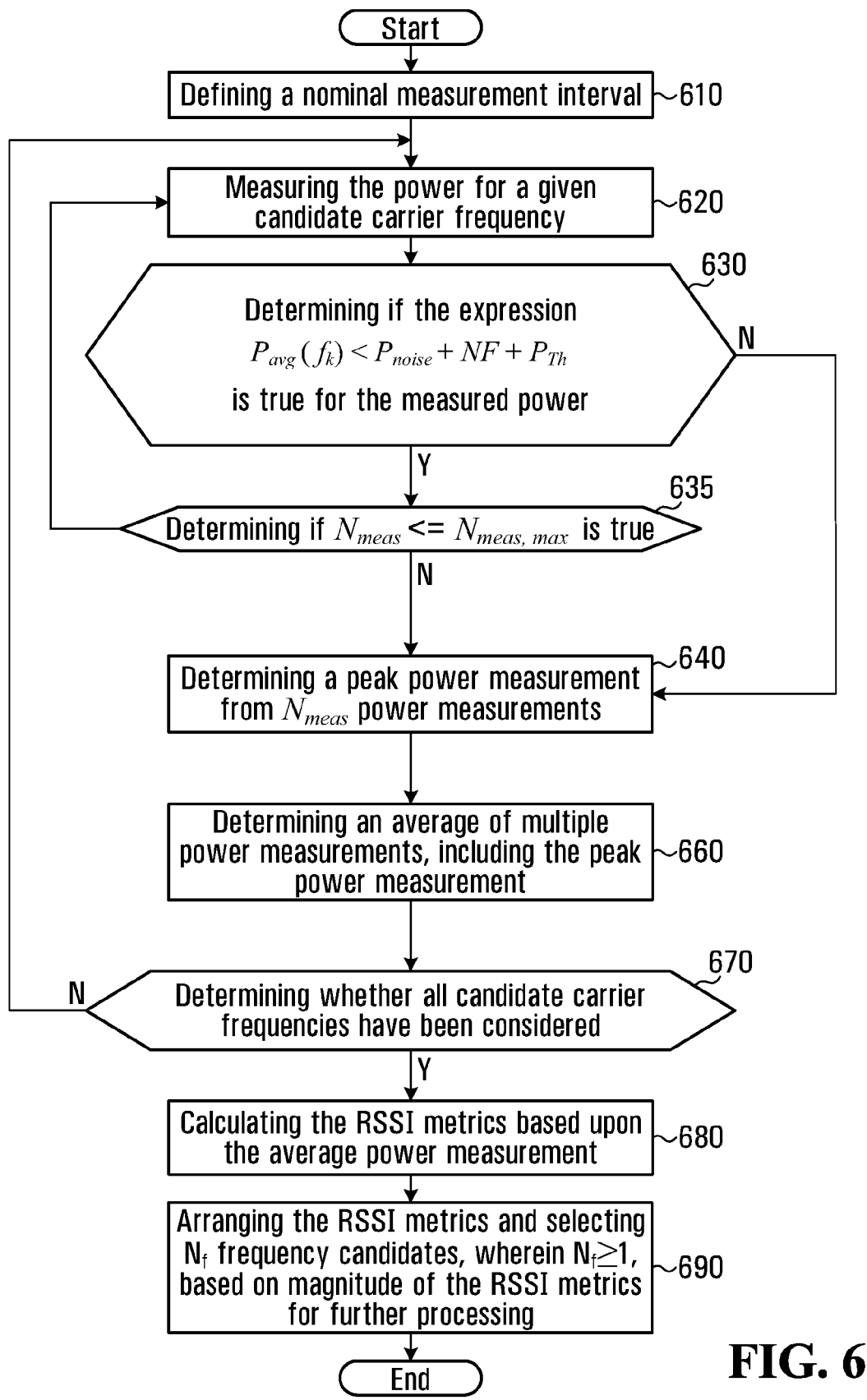
FIG. 6 is a flow chart illustrating a method according to an embodiment of the application.

An example adaptive measurement interval scheme is described below with reference to FIG. 6. A first step 610 involves defining a nominal measurement interval ($T_{meas}$). In a particular implementation, $T_{meas}$ is equal to one subframe, which may be 1 ms. However, more generally, $T_{meas}$ is chosen as desired for the particular implementation.

A second step 620 involves measuring the power for a given carrier frequency. The measured power for carrier frequency $f_k$ is denoted by $P_{avg}(f_k)$. A further step 630 involves determining if the expression:

$$P_{avg}(f_k) < P_{noise} + NF + P_{Th} \quad (3)$$

is true for the measured power. In expression (3), $P_{noise}$ may be set to $-114$ dBm/MHz$+10 \log 10(B_{pav})$ wherein $B_{pav}$ (MHz) is the effective measurement bandwidth for a given carrier frequency, NF is the UE receiver noise figure and typically can be assumed to be 6 dB, and $P_{Th}$ is a user configurable threshold used to determine if the received signal power is strong enough and can be considered reliable. If the expression is true, "Y" path of step 630, meaning that the $P_{avg}$ value is not considered reliable, the method proceeds to step 635. If the expression is not true, "N" path of step 630, meaning that the $P_{avg}$ value is considered reliable, the method proceeds to step 640. This is true even for $N_{meas}=1$, i.e. a first measurement, for which if the expression is not true, the power measurement for that carrier frequency is sufficient and the measurement interval will not be adaptively changed.

Step 635 involves determining if $N_{meas} \leq N_{meas,max}$ where $N_{meas}$ is the number of measurements that have been performed and $N_{meas,max}$ is a maximum number of measurements to be performed based on a particular number of subframes that should ideally ensure at least one DL frame is detected. If $N_{meas} \leq N_{meas,max}$ is true, "Y" path of step 635, the method goes back to step 620 to measure the power again. If $N_{meas} \leq N_{meas,max}$ is not true, "N" path of step 635, meaning a maximum number of measurements has been reached, the method proceeds to step 640.

Values for $P_{Th}$ and $N_{meas,max}$ are selected as appropriate to enable a trade-off between measurement accuracy and scan time. The setting of $P_{Th}$ may take into consideration noise figure variation, which is a noise value pertaining to the front end receiver electronics of the UE, power measurement variation from the nominal measurement interval, and corresponding RSSI scan performance based on the fixed nominal measurement interval. As a result, in some implementations $P_{Th}$ is set to 3 dB.

In particular implementations $N_{meas,max}$ may be selected to be 5, which results in a total time interval over which measurements could be made as $5 \times T_{meas}$. Since the UE is likely unaware of any frame boundary of the candidate carrier frequency being measured, it is possible that a subframe based measurement interval may overlap with a fraction of an MBSFN subframe or TDD UL or special subframe. However, by selecting $N_{meas,max}$ to be sufficiently large, this ensures that at least one normal DL subframe should be measured. By setting $N_{meas,max}$ to 5, at least a fraction of the power from a non-MBSFN downlink subframe may be captured. More generally, $N_{meas,max}$ is chosen as desired for the particular implementation.

In an implementation in which a narrow-band filter is used in the power measurement as discussed above, $B_{pav}$ is equal to the double-sided filter bandwidth. In an implementation in which a wide band filter followed by a Discrete Fourier Transform (DFT) is used in the power measurement as discussed above, $B_{pav}$ is equal to the filter sampling frequency divided by the DFT size.

Steps 640 and 660 involve obtaining an overall power measurement by combining the $N_{meas}$ power measurements for the same candidate carrier frequency, where $N_{meas}$ may be less than $N_{meas,max}$. Subsequent to step 635, a further step 640 involves determining the peak power measurement $P_{peak}(f_k)$ from $N_{meas}$ power measurements based on the expression:

$$P_{peak}(f_k) = \max\{P_{avg}(f_k,t), t=t_n, t_{n+1}, \ldots t_{n+N_{meas}-1}\} \quad (4)$$

where a time instant t is introduced to the power measurement $P_{avg}(f_k)$. In other words, the power measurement for candidate carrier frequency $f_k$ at time instant t is denoted by $P_{avg}(f_k, t)$.

Step 660 involves averaging the multiple power measurements, including the peak power measurement, which are within a predefined threshold ($P_{peak-th}$) of the peak power measurement. It can be expressed mathematically as:

$$\overline{P}_{avg}(f_k) = \text{average}\{P_{avg}(f_k,t), \text{if } P_{peak}(f_k) - P_{avg}(f_k,t) \leq P_{peak-th}\} \quad (5).$$

In some embodiments a value for $P_{peak-th}$ is chosen with the intent to exclude power measurements potentially from intervals where there is no DL signal. In some embodiments, a particularly useful value of $P_{peak-th}$ is 3 dB. However, more generally, $P_{peak-th}$ is chosen as desired for the particular implementation.

Steps 640 and 660 may be performed for $N_{meas}=1$ even though the peak power measurement and average of the peak power measurements would be equal to the $N_{meas}=1$ value. Alternatively, if $N_{meas}=1$ at step 630, if the expression is not true, "N" path of step 630, the method may proceed directly (not shown) to step 670.

Step 670 involves determining if all of the candidate carrier frequencies have been considered. If all of the candidate carrier frequencies have been considered, "Y" path of step 670, the method proceeds to step 680. If all of the candidate carrier frequencies have not been considered, "N" path of step 670, the method returns to step 620.

Once the power measurements for all candidate carrier frequencies are performed, a further step 680 involves calculating the RSSI metrics for each of the candidate carrier frequencies. In one implementation, the averaged power measurements calculated according to equation (5) are treated as the RSSI metrics. In another implementation, the averaged power measurements in different hypothetical occupied portions and guard portions are calculated according to equation (5) followed by a calculation of RSSI differences according to equation (1) and further followed by a calculation of RSSI metrics according to equation (2). Once all of the RSSI metrics have been calculated at step 680, a further step 690 involves arranging the RSSI metrics in order of magnitude and selecting $N_f$ carrier frequencies having RSSI metrics with the largest magnitudes as the frequency candidates, wherein $N_f \geq 1$, for further processing, in particular determination of whether a cell is operating at that carrier frequency.

Figure 7A:
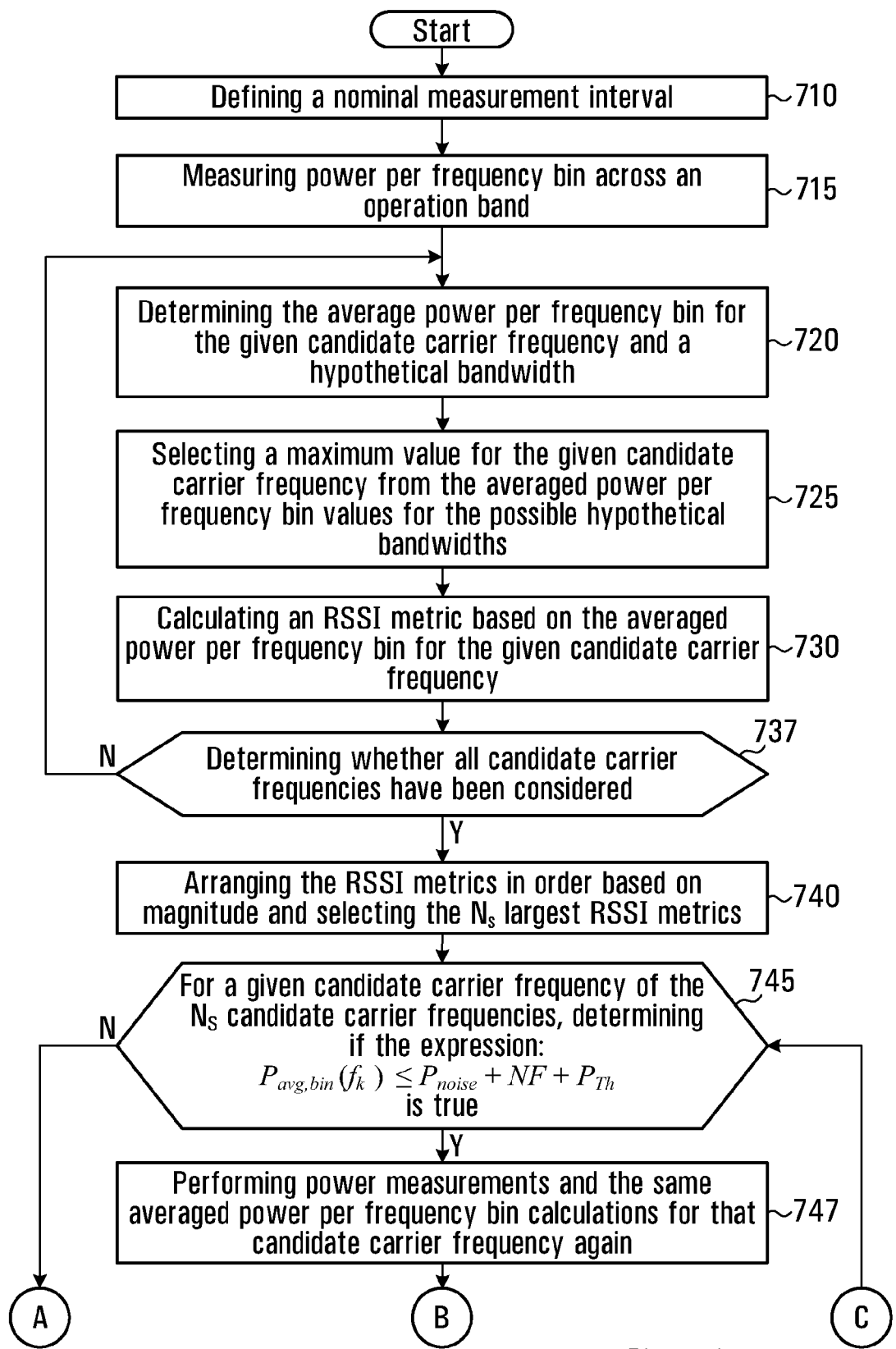
FIGS. 7A and 7B comprise a flow chart illustrating a further method according to an embodiment of the application.
Figure 7B:
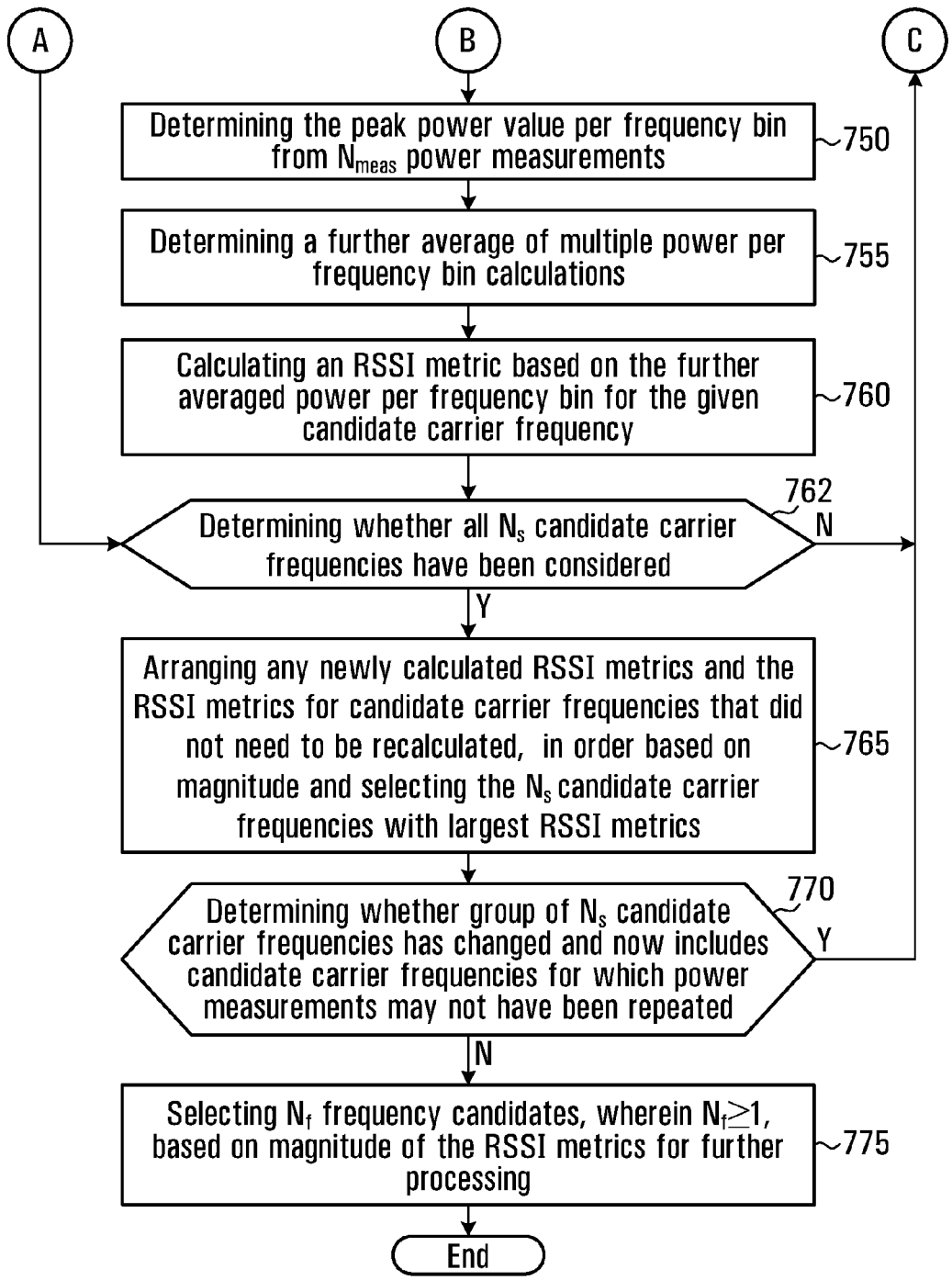

Another adaptive measurement interval scheme involves refining the RSSI measurements after the selection of the $N_f$ candidate carrier frequencies. This may avoid having to perform multiple power measurements at candidate carrier frequencies where there are no LTE channels at all. An example of another adaptive measurement interval scheme will be described below with reference to FIGS. 7A and 7B for which each candidate carrier frequency has multiple possible bandwidths, for example 1.4 MHz, 3 MHz, 5 MHz, 10 MHz, 15 MHz and 20 MHz.

A first step 710 involves selecting a nominal measurement interval ($T_{meas}$).

A second step 715 involves measuring power per frequency bin, denoted by $P_{bin}$, across an operating band containing multiple candidate carrier frequencies, over which an RSSI scan is of interest. The frequency bin is an effective measurement bandwidth. In an implementation in which a wide band filter followed by a DFT processing is used in performing the power measurement, the frequency bin size is equal to the filter sampling frequency divided by the DFT size. Here, the frequency bin size is chosen to be very small as compared with the smallest hypothetical channel bandwidth. In one implementation, the frequency bin size is 100 kHz. In another implementation, the frequency bin size is the same as the subcarrier spacing, i.e., 15 kHz.

A third step 720 involves determining an average power per frequency bin for a given candidate frequency and a hypothetical channel bandwidth $B_m$ as expressed in the equation below:

$$P_{avg,bin}(f_k, B_m) = \frac{P_{occupiedband}(f_k, B_m)}{N_{occupiedband}(f_k, B_m)}. \quad (6)$$

where $P_{occupiedband}(f_k, B_m)$ is the measured power within the hypothetical occupied portion and $N_{occupiedband}(f_k, B_m)$ is the corresponding number of frequency bins within the hypothetical occupied portion. In LTE, $B_m$ is a bandwidth equal to one of 1.4, 3, 5, 10, 15, 20 MHz. In one implementation, $P_{occupiedband}(f_k, B_m)$ is a sum of the measured powers $P_{bin}$ for the frequency bins collectively forming the hypothetical occupied portion of $B_m$.

A fourth step 725 involves selecting a maximum value from the $P_{avg,bin}(f_k, B_m)$ values determined for each of the possible bandwidths for the given candidate carrier frequency. The maximum value of the $P_{avg,bin}(f_k, B_m)$ values for carrier frequency $f_k$ is denoted by $P_{avg,bin}(f_k)$, which can be expressed as:

$$P_{avg,bin}(f_k) = \max\{P_{avg,bin}(f_k, B_m) \text{ for all } B_m \text{ values}\} \quad (7).$$

A fifth step 730 involves calculating an RSSI metric based on the averaged power per frequency bin for the given candidate carrier frequency. In one implementation, the averaged power per frequency bin calculated according to equation (7) is the RSSI metric. In another implementation, an RSSI difference, denoted by $RSSI_{diff}$, is determined based on the calculated power per frequency bin for a hypothetical occupied portion and guard portion according to equation (1) and a final RSSI metric is determined by selecting a maximum $RSSI_{diff}$ value from the $RSSI_{diff}$ values determined for each of the possible bandwidths for each carrier frequency, which can be expressed using equation (2) above.

A further step 737 involves determining whether all candidate carrier frequencies have been considered in the operating band. If all candidate carrier frequencies have been considered, "Y" path of step 737, the method proceeds to step 740. If all candidate carrier frequencies have not been considered, "N" path of step 737, the method returns back to step 720.

A further step 740 involves arranging the RSSI metrics calculated for each of the candidate carrier frequencies in order based on magnitude and selecting the $N_s$ largest RSSI metrics, which correspond to $N_s$ respective candidate carrier frequencies. $N_s$ may be selected at least as large, and preferably larger, than the final set size, i.e. $N_f$, of the carrier frequency candidates to be passed on for further cell search processing.

A further step 745 involves for a given candidate carrier frequency of the $N_s$ candidate carrier frequencies, determining if the expression:

$$P_{avg,bin}(f_k) \leq P_{noise} + NF + P_{th} \quad (8)$$

is true, where $P_{noise}$, $N_f$ and $P_{th}$ are defined above with regard to equation (3). The effective measurement bandwidth used to calculate $P_{noise}$ here is the frequency bin size. If the expression is true, "Y" path of step 745, the method proceeds to step 747. If the expression is not true, "N" path of step 745 the method proceeds to step 762.

Step 747 involves performing power measurements and the same average power per frequency bin calculations, i.e. in some embodiments, the same calculations of steps 720, 725 and 730, for that candidate carrier frequency again.

In some implementations, a hard stop point on the number of times that the power measurement is performed can be set, for example if the total number of times that the power measurement is performed for the same carrier frequency is greater than a given threshold $N_{meas,max}$.

Step 750 involves determining the peak power value per frequency bin $P_{peak,bin}(f_k)$ from $N_{meas}$ power measurements based on the expression:

$$P_{peak,bin}(f_k) = \max\{P_{avg,bin}(f_k,t),$$
$$t=t_n, t_{n+1}, \ldots t_{n+N_{meas}-1}\} \quad (9).$$

where $P_{avg,bin}(f_k, t)$ is the calculated power value for candidate carrier frequency $f_k$ at time instant t.

Step 755 involves determining a further average of multiple power per frequency bin calculations for calculations that are within a predefined threshold ($P_{peak-th,bin}$) of the peak power value, which can be expressed mathematically as:

$$\overline{P}_{avg,bin}(f_k) = \text{average}\{P_{avg,bin}(f_k,t), \text{ if } P_{peak,avg}(f_k) -$$
$$P_{avg,bin}(f_k,t) \leq P_{peak-th,bin}\} \quad (10).$$

A value for $P_{peak-th,bin}$ is chosen with the intent to exclude smaller $P_{avg,bin}$ values, which are likely from intervals where there is no DL signal. In some embodiments, a particularly useful value of $P_{peak-th,bin}$ is 3 dB. However, more generally, $P_{peak-th,bin}$ is chosen as desired for the particular implementation.

A further step 760 involves calculating an RSSI metric based on the averaged power per frequency bin for the given candidate carrier frequency. In one implementation, the averaged power per frequency bin calculated according to equation (10) is the RSSI metric. In another implementation, an RSSI difference, denoted by $RSSI_{diff}$, is determined based on the calculated power per frequency bin for a hypothetical occupied portion and guard portion according to equation (1) and a final RSSI metric is determined by selecting a maximum $RSSI_{diff}$ value from the $RSSI_{diff}$ values determined for each of the possible bandwidths for each carrier frequency, which can be expressed using equation (2) above.

Step 762 involves determining whether all of the $N_s$ candidate carrier frequencies have been considered. If all $N_s$ candidate carrier frequencies have been considered, "Y" path of step 762, the method proceeds to step 765. If all candidate $N_s$ carrier frequencies have not been considered, "N" path of step 762, the method returns back to step 745.

Step 765 involves arranging any newly calculated RSSI metrics, and any RSSI metrics for candidate carrier frequencies that did not need to be recalculated, in order based on magnitude and selecting the $N_s$ largest RSSI metrics. This may result in an updated group of $N_s$ candidate carrier frequencies in which some of the candidate carrier frequencies that were not in the former group of $N_s$ candidate carrier frequencies are included in the updated group.

Step 770 involves determining whether the group of $N_s$ candidate carrier frequencies has changed and now includes candidate carrier frequencies for which power measurements may not have been repeated. If the group of $N_s$ candidate carrier frequencies has changed, "Y" path of step 770, the method returns to step 745. If the group of $N_s$ candidate carrier frequencies has not changed, "N" path of step 770, the method proceeds to step 775. In some embodiments, it may not be necessary to perform steps 745 to 762 for all of the $N_s$ candidate carrier frequencies. It might only be done for new candidate carrier frequencies that have been added to the set of $N_s$ candidate carrier frequencies.

Once the power measurements for all $N_s$ candidate carrier frequencies are examined, a further step 775 involves selecting $N_f$ frequency candidates having associated RSSI metrics, wherein $N_f \geq 1$, for further processing, in particular determination of whether a cell is operating at that carrier frequency.

The power measurement interval does not necessarily have to be $N_{meas}$ contiguous subframes. $N_{meas}$ measurements can be spread in time to have some time diversity against the channel fading and to have them scheduled in such a way that they capture different sections of the radio frame with small overlap between two contiguous sections to handle the potential TDD and/or MBSFN subframes.

The power measurement interval $T_{meas}$ for each repeated power measurement does not necessarily have to be the same. $T_{meas}$ may be increased for each repeated power measurement.

In some embodiments, as compared with the RSSI scan having a fixed measurement interval, the proposed adaptive measurement interval approach may better be able to handle TDD subframes and/or MBSFN subframes and provide better RSSI scan results, which can lead to a higher success rate to find a suitable cell and thus reduce the mean frequency scan time.

The proposed adaptive measurement interval approach may help UEs at the edge boundary of a cell or UEs experiencing deep fading to have a better power measurement when their received signal power is weak. In such a case, the RSSI scan time for the power measurement will be slightly higher, but the revised RSSI measurement may help enhance the success rate of detection and reduce the number of attempts required in the synchronization signal based cell search stage. This may lead to a reduced mean frequency scan time and in turn lead to UE battery power savings.

Figure 8:
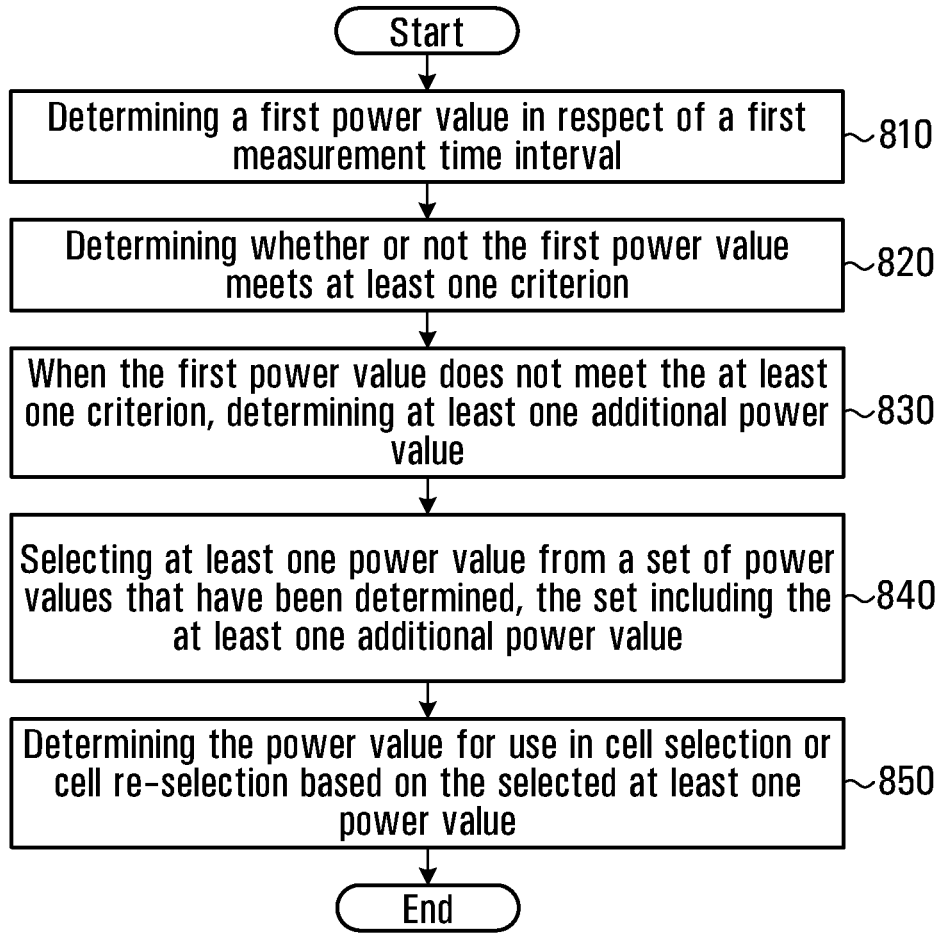
FIG. 8 is a flow chart illustrating yet a further method according to an embodiment of the application.

Referring now to FIG. 8, a method will now be described for determining a power value for use in cell selection or cell re-selection. A first step 810 involves, determining a first power value in respect of a first measurement time interval. A second step 820 involves determining whether or not the first power value meets at least one criterion. A third step 830 involves, when the first power value does not meet the at least one criterion, determining at least one additional power value. A fourth step 840 involves selecting at least one power value from a set of power values that have been determined, the set including the first power value and the at least one additional power value. A fifth step 850 involves determining a power value for use in cell selection or cell re-selection based on the selected at least one power value.

In some embodiments, determining at least one additional power value involves determining at least one additional power value until a current additional power value meets the at least one criterion or a maximum number of repetitions of determining at least one additional power value have been performed. In some embodiments, determining at least one additional power value comprises determining at least one additional power value until a current power value meets the at least one criterion or a maximum number of repetitions of determining the power value have been performed. In some embodiments, the at least one criterion may include criteria defined by equations (3) or (8).

In some embodiments, selecting at least one power value involves, if there is a power value of the at least one additional power value that satisfies the at least one criterion, selecting at least that power value. In such a case the power metric for use in cell selection or cell re-selection is based on the power value of the at least one additional power value that satisfies the at least one criterion.

In some embodiments, selecting at least one power value further involves determining a maximum power value from the set of power values that have been determined.

In some embodiments, selecting at least one power value involves generating a subset of the set of power values by selecting for inclusion in the subset the maximum power value and any power values of the set of power values that are within a specified range of the maximum power value of the set of power values and taking an average of power values in the subset of the set of power values.

In some embodiments a power value is determined for each of one or more of a plurality of candidate carrier frequencies. In some embodiments a power value is determined for each of one or more channel hypothesis associated with at least one of the plurality of candidate carrier frequencies. In implementations directed to E-UTRA, the one or more channel hypothesis may include channel bandwidths equal to 1.4 MHz; 3 MHz; 5 MHz; 10 MHz; 15 MHz; and 20 MHz. However, more generally, the channel bandwidths are specific to the desired implementation.

In some embodiments, when more than one power value has been determined a maximum power value can be selected from the set of power values. In some embodiments a group of power values may be selected for determining an average maximum power value by selecting any power values that are within a specified range of the maximum power value.

Figure 9A:
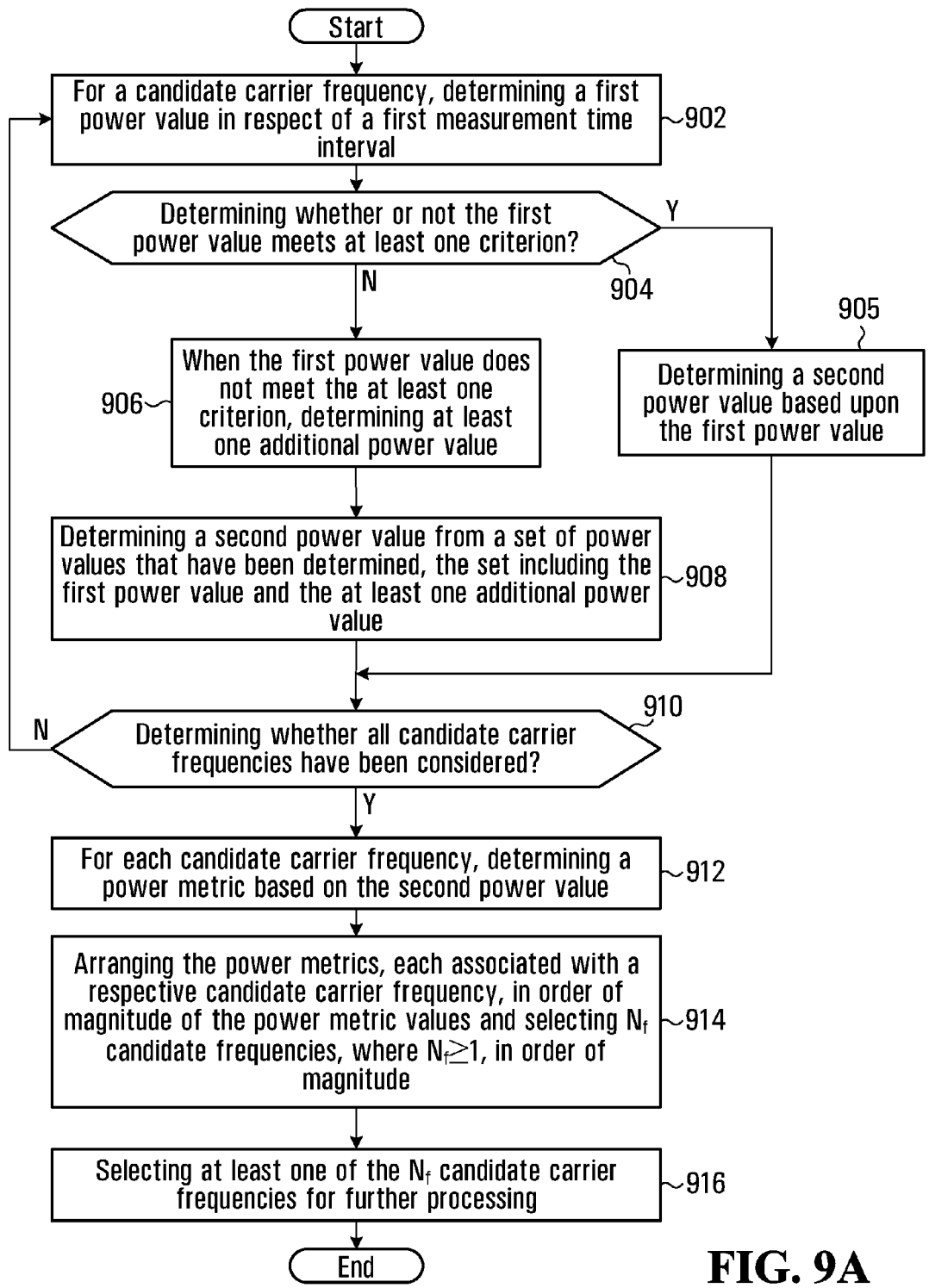
FIG. 9A is a flow chart illustrating still a further method according to an embodiment of the application.

Referring now to FIG. 9A, a more detailed method will now be described for determining a power value for use in cell selection or cell re-selection. The method is performed by evaluating a plurality of candidate carrier frequencies in an operating band. A first step 902 involves for a candidate carrier frequency of the plurality of candidate carrier frequencies in an operating band, determining a first power value in respect of a first measurement time interval. A second step 904 involves determining whether or not the first power value meets at least one criterion. If the first power value meets at least one criterion, "Y" path of step 904, the method proceeds to step 905, which involves determining a second power value based upon the first power value. After step 905 is performed, the method proceeds to step 910. If the first power value does not meet at least one criterion, "N" path of step 904, the method proceeds to step 906.

A third step 906 involves when the first power value does not meet the at least one criterion, determining at least one additional power value. A fourth step 908 involves determining a second power value from a set of power values that have been determined, the set including the first power value and the at least one additional power value. In some embodiments, determining the second power value further involves determining a maximum power value from the set of power values that have been determined. In some embodiments, determining the second power value involves generating a subset of the set of power values by selecting for inclusion in the subset the maximum power value and any power values of the set of power values that are within a specified range of the maximum power value of the set of power values and taking an average of power values in the subset of the set of power values. In some embodiments, the at least one criterion may include criteria defined by equations (3) or (8).

A fifth step 910 involves determining whether all candidate carrier frequencies of the plurality of candidate carrier frequencies have been considered. If all candidate carrier frequencies have been considered, "Y" path of step 910, the method proceeds to step 912. If all candidate carrier frequencies have not been considered, "N" path of step 910, the method returns to step 902.

A sixth step 912 involves determining a power metric for each candidate carrier frequency based on the second power value. A seventh step 914 involves arranging the power metrics, each associated with a respective candidate carrier frequency, in order of magnitude of the power metric values and selecting the $N_f$ largest candidate carrier frequencies, where $N_f \geq 1$. An eighth step 916 involves selecting at least one of the $N_f$ candidate carrier frequencies for further processing.

By way of comparison between FIG. 8 and FIG. 9A, in some embodiments step 810 is similar to step 902, step 820 is similar to step 904, step 830 is similar to step 906, step 840 is similar to step 908 and step 850 is similar to what is described in steps 912, 914 and 916.

Figure 9B:
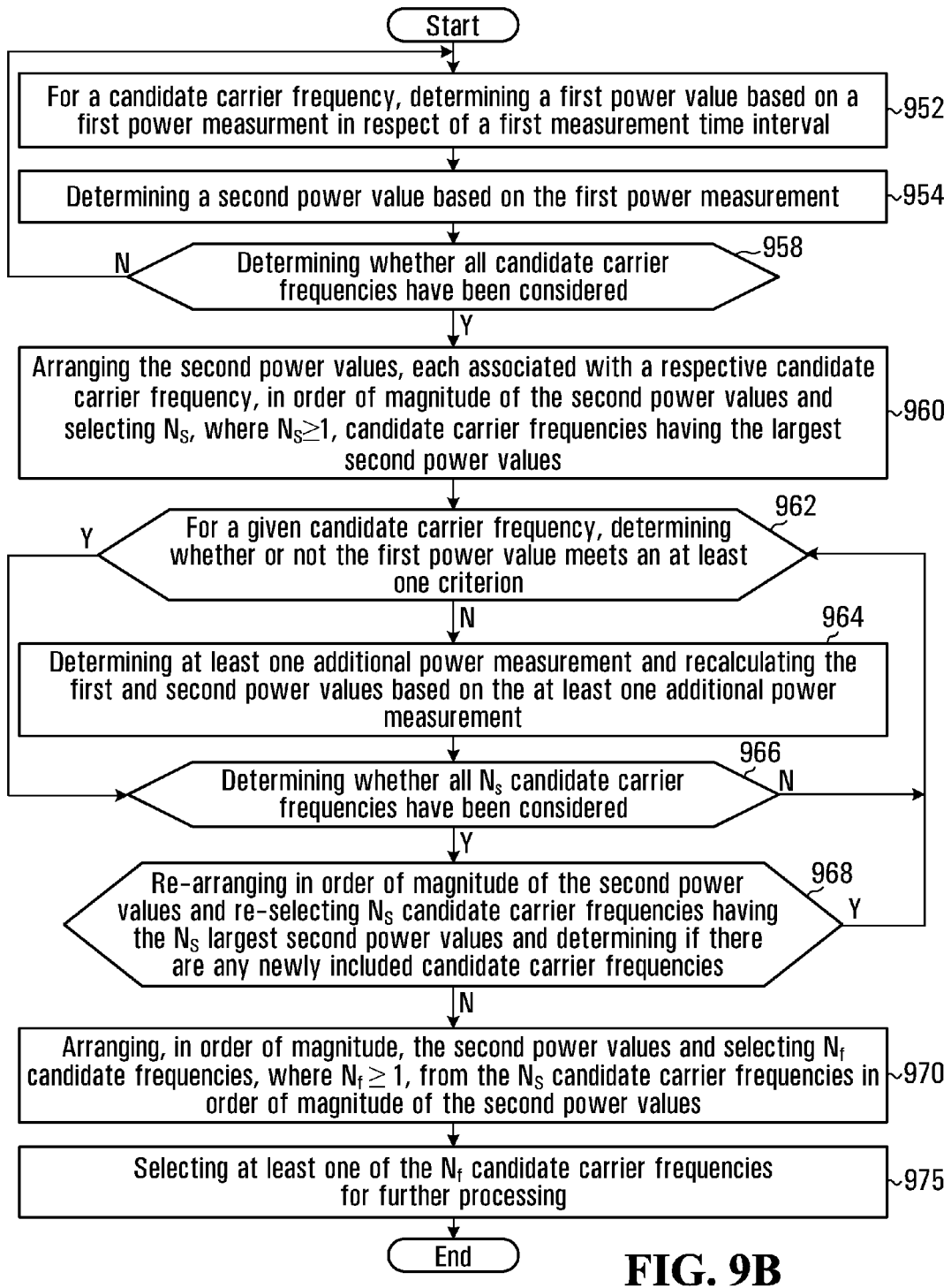
FIG. 9B is a flow chart illustrating still another method according to an embodiment of the application.

Referring now to FIG. 9B, another more detailed method will now be described for determining a power value for use in cell selection or cell re-selection. The method is performed by evaluating a plurality of candidate carrier frequencies in an operating band. Step 952 involves for a candidate carrier frequency of the plurality of candidate carrier frequencies in an operating band determining a first power value based on a first power measurement in respect of a first measurement time interval.

A further step 954 involves determining a second power value based on the first power value. In some embodiments, determining the second power value further involves determining a maximum power value from the set of power values that have been determined. In some embodiments, determining the second power value involves generating a subset of the set of power values by selecting for inclusion in the subset the maximum power value and any power values of the set of power values that are within a specified range of the maximum power value of the set of power values and taking an average of power values in the subset of the set of power values.

Step 958 involves determining whether all candidate carrier frequencies have been considered. If all candidate carrier frequencies have been considered, "Y" path of step 958, the method proceeds to step 960. If all candidate carrier frequencies have not been considered, "N" path of step 958, the method returns to step 952.

Step 960 involves arranging the second power values, each associated with a respective candidate carrier frequency, in order of magnitude of the second power values and selecting $N_S$ candidate carrier frequencies having the largest second power values, where $N_S \geq 1$. A further step 962 involves for a given candidate carrier frequencies of the $N_S$ candidate carrier frequencies, determining whether or not the first power value, associated with the candidate carrier frequency, meets at least one criterion. If the first power value meets at least one criterion, "Y" path of step 962, the method proceeds to step 966. If the first power value does not meet at least one criterion, "N" path of step 962, the method proceeds to step 964. In some embodiments, the at least one criterion may include criteria defined by equations (3) or (8).

Step 964 involves determining at least one additional power measurement and recalculating the first and second power values based on the at least one additional power measurement. In some embodiments, a single additional power measurement is made each time step 964 is repeated.

Step 966 involves determining whether all $N_s$ candidate carrier frequencies have been considered. If all $N_s$ candidate carrier frequencies have been considered, "Y" path of step 966, the method proceeds to step 968. If all $N_s$ candidate carrier frequencies have not been considered, "N" path of step 966, the method returns to step 962.

Step 968 involves re-arranging in order of magnitude of the second power values and re-selecting $N_S$ candidate carrier frequencies having the $N_s$ largest second power values and determining if there are any newly included candidate carrier frequencies. If there are newly included candidate carrier frequencies, "Y" path of step 968, the method returns to step 962. As indicated above, in some embodiments, each time the method returns to step 964, via step 962, a new single additional power measurement is made that enables an adaptive measurement interval. If there are no newly included candidate carrier frequencies, "N" path of step 968, the method proceeds to step 970.

Step 970 involves arranging, in order of magnitude, the second power values and selecting $N_f$ candidate carrier frequencies, where $N_f \geq 1$, from the $N_s$ candidate carrier frequencies, in order of magnitude of the second power values. A final step 975 involves selecting at least one of the $N_f$ candidate carrier frequencies for further processing.

In some embodiments, the first and second power values are first and second metrics, in which the first metric may be determined consistent with one of equations (5) or (10) and the second metric may be determined consistent with equation (2).

By way of comparison between FIG. 8 and FIG. 9B, in some embodiments step 810 is similar to step 952, step 820 is similar to step 962, step 830 is similar to the determining portion of step 964, step 840 is similar to the calculating portion of step 964 and step 850 is similar to what is described in steps 968, 970 and 975. Additional steps, such as step 954 and 960 also occur in FIG. 9B, that are not explicitly described with respect to FIG. 8.

With reference to FIGS. 9A and 9B, the above description refers to candidate carrier frequencies. However, the same methods could apply to scenarios in which the candidate carrier frequencies are considered to be channel hypotheses (also described above) in which a channel hypothesis is considered to be a candidate carrier frequency with a particular bandwidth, which means that a particular candidate carrier frequency may be represented by several channel hypotheses. For example, a single candidate carrier frequency may be represented by multiple channel hypotheses for bandwidths such as 1.4 MHz, 3 MHz, 5 MHz, 10 MHz, 15 MHz and 20 MHz. However, it is to be understood that the bandwidths in channel hypotheses are implementation specific.

Figure 10:
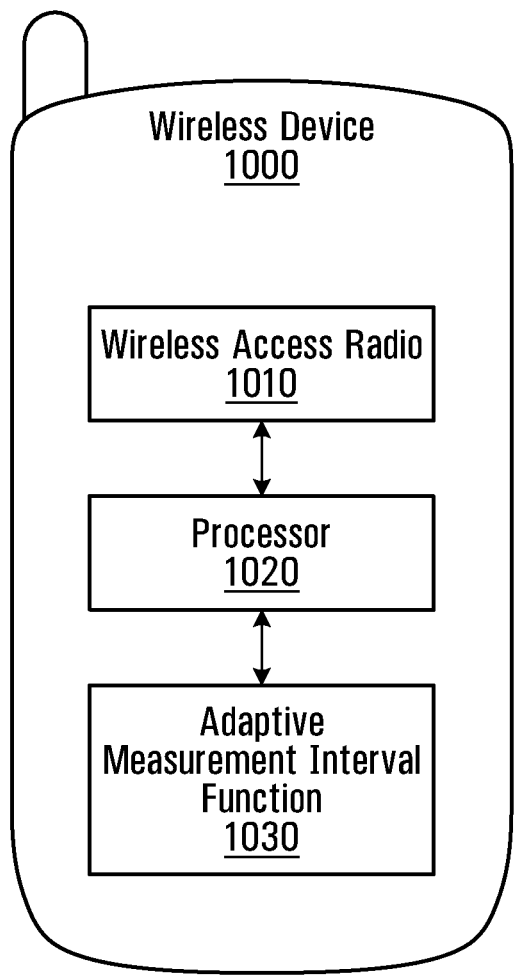
FIG. 10 is a block diagram of an example wireless device according to an implementation described herein.

Referring now to FIG. 10, shown is a block diagram of an example wireless device 1000 adapted to communicate using circuit switched and packet switched communications separately or simultaneously. The wireless device 1000 has a processor 1020 coupled to a wireless access radio 1010. The wireless access radio 1010 is broadly considered to be configured to communicate with wireless networks. In some embodiments, the wireless access radio may be implemented as more than one wireless access radio, each one configured to access a different type of network. The wireless device also has an Adaptive Measurement Interval Function 1030 that is configured to operate in a manner consistent with the methods described above for performing power measurement at each candidate carrier frequency with an adaptive measurement interval. Adaptive Measurement Interval Function 1030, while illustrated as a single functional block in FIG. 10, may also be considered to have multiple sub-components, each sub-component configured to perform in a manner consistent with one or more of the example methods described above in FIGS. 6, 7A, 7B, 8, 9A and 9B. In some embodiments the wireless device 1000 is a multi-mode mobile wireless device.

In operation, the wireless device 1000 is adapted to communicate wirelessly over one or more types of wireless communication networks, for example a Universal Telecommunications Radio Access Network (UTRAN) network and a Generic Access Network (GAN), such as a Wi-Fi network, using the wireless access radio 1010. The wireless device 1000 is adapted to communicate using circuit switched and packet switched communications separately or simultaneously. In some embodiments, wireless access radio 1010 is configured to receive information broadcast by a network comprising characteristics pertaining to one or more telecommunication cells in the network. In some embodiments, the processor 1020 is configured to execute the Adaptive Measurement Interval Function 1030. The Adaptive Measurement Interval Function 1030 is configured to perform the various methods described above.

The Adaptive Measurement Interval Function 1030 can be implemented using one of software, hardware, and firmware, or a suitable combination thereof. For example, application specific integrated circuits (ASIC) or field programmable gate arrays (FPGA) may be used to implement the function in hardware. To implement the function in software, in some embodiments, a microprocessor may be used capable of executing computer readable program code instructions on a computer-readable medium.

The device of FIG. 10 shows only a wireless access radio 1010, a processor 1020 and an Adaptive Measurement Interval function 1030 relevant to performing adaptive measurement processing which may be used in conjunction with cell selection and re-selection. It is to be understood that practical implementations would include additional physical elements or functionality, or both, to that shown, for example, a wideband filter and FFT based spectral analysis tool or a narrowband filter, or both, depending on the type of processing being performed, at least one ADC, at least one mixer for down converting received signals, and other receive signal circuitry. The preceding list is not considered to be exhaustive, but to act as an example of such additional physical elements or functionality.

Another Wireless Device

Figure 11:
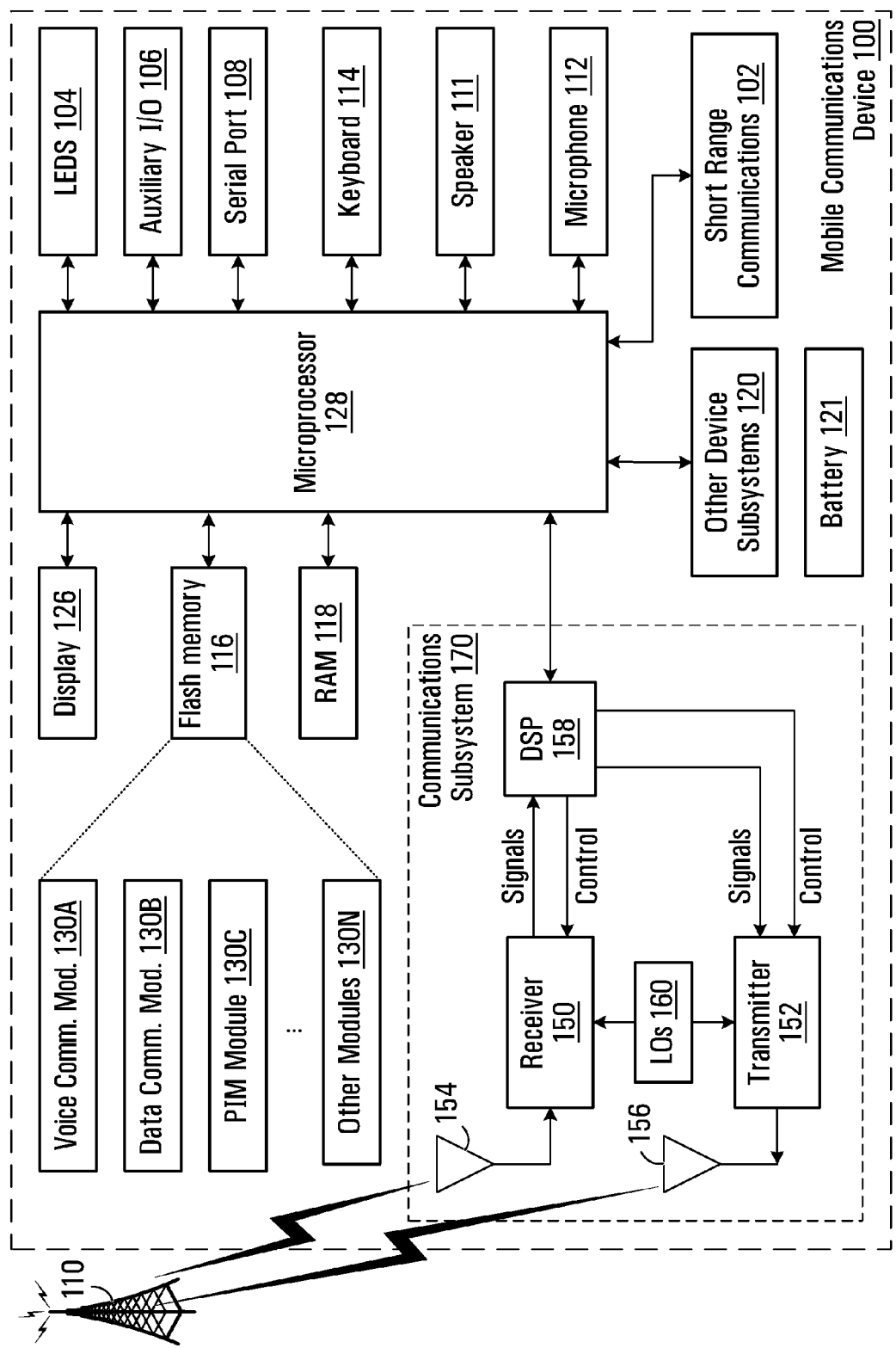
FIG. 11 is a block diagram of another wireless device.

Referring now to FIG. 11, shown is a block diagram of another wireless device 100 that may implement any of the wireless device methods described herein. The wireless device 100 is shown with specific components for implementing features described above, for example those generally illustrated in FIGS. 6, 7A, 7B, 8 9A and 9B. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 1020 of the wireless device 1000 shown in FIG. 10. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Universal Mobile Telecommunication System (UMTS), Long Term Evolution (LTE), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

The invention claimed is:

1. A method of determining a power value at a user device for subsequent use in cell selection or cell re-selection, the method comprising:

determining a first power value at a carrier frequency in respect of a first measurement time interval by determining at least one of a first and second metric for each of at least one channel hypotheses, each channel hypothesis having a hypothetical occupied portion and a hypothetical guard band portion, a first metric based on a power measurement and at least one additional power measurement of the hypothetical occupied portion and a second metric based on a difference between the power measurement and the at least one additional power measurement of the hypothetical occupied portion and a power measurement and at least one additional power measurement of the hypothetical guard band portion;

determining whether or not the first power value meets at least one criterion;

when the first power value does not meet the at least one criterion, determining at least one additional power value at the carrier frequency in respect of a second measurement time interval;

selecting at least one power value from a set of power values that have been determined, the set including the at least one additional power value, wherein selecting the at least one power value includes at least determining a maximum power value from the set of power values that have been determined;

determining the power value for the calculation of an RSSI metric for use in cell selection or cell re-selection based on the selected at least one power value.

2. The method of claim 1 wherein selecting at least one power value comprises:

if there is a power value of the at least one additional power value that satisfies the at least one criterion, selecting at least that power value, in which case the power value for use in cell selection or cell re-selection is set to the power value of the at least one additional power value that satisfies the at least one criterion.

3. The method of claim 1 wherein selecting the at least one power value further comprises:

generating a subset of the set of power values by selecting for inclusion in the subset the maximum power value and any power values of the set of power values that are within a specified range of the maximum power value of the set of power values.

4. The method of claim 3 wherein determining the power value for use in cell selection and cell re-selection comprises determining an average power value from the subset of the set of power values.

5. The method of claim 1 wherein determining at least one additional power value comprises determining at least one additional power value until either one of:

a current additional power value meets the at least one criterion; or a maximum number of repetitions of determining at least one additional power value have been performed.

6. The method of claim 1 wherein determining a power value is performed for each of one or more of a plurality of candidate carrier frequencies.

7. The method of claim 6 wherein determining a power value is performed for each of one or more channel hypothesis associated with at least one of the plurality of candidate carrier frequencies.

8. The method of claim 1 wherein selecting the at least one channel hypothesis for further processing comprises:

arranging the metrics determined for the plurality of channel hypotheses according to order of magnitude and selecting $N_f$ metrics, where $N_f \geq 1$, each associated with a channel hypothesis based on the largest magnitude metrics; and selecting at least one of the $N_f$ channel hypotheses for further processing based on a largest magnitude metric.

9. The method of claim 1 wherein determining a first power value in respect of a first measurement time interval comprises:

determining the first power value in respect of a first measurement time interval for each of at least one channel hypothesis.

10. The method of claim 9 wherein determining at least one additional power value comprises determining at least one additional power value until either one of:

a current metric meets the at least one criterion; or a maximum number of repetitions of determining the metric have been performed.

11. The method of claim 1, wherein determining a first power value in respect of a first measurement time interval comprises:

for each of a plurality of candidate carrier frequencies:

determining a first metric in respect of a power measurement of a first measurement time interval; and determining a second metric in respect of the power measurement of the first measurement time interval.

12. The method of claim 11, further comprising:

for the plurality of candidate carrier frequencies:

arranging the second metrics, each associated with a respective candidate carrier frequency, in order of magnitude and selecting $N_S$, where $N_S \geq 1$, largest second metrics; and wherein determining whether or not the first power value meets at least one criterion comprises:

for each of the $N_S$ candidate carrier frequencies associated with the second metrics, determining whether a first metric associated with the same candidate carrier frequency meets at least one criterion.

13. The method of claim 12, wherein determining whether the first metric meets at least one criterion comprises:

for each of the $N_s$ candidate carrier frequencies:

when the first metric does not meet the at least one criterion;

determining at least one additional power measurement; and wherein selecting at least one power value from a set of power values that have been determined comprises:

recalculating the first and second metrics based upon the power measurement of the first measured time interval and the at least one additional power measurement.

14. The method of claim 13, wherein determining the power value for use in cell selection or cell re-selection based on the selected at least one power value comprises:

re-arranging all of the second metrics, including original and re-calculated metrics, in order of magnitude and selecting the $N_S$, where $N_S \geq 1$, largest second metrics;

for each of the $N_S$ candidate carrier frequencies associated with the second metrics, determining whether a first metric associated with the same candidate carrier frequency meets at least one criterion.

15. The method of claim 14 further comprising:

arranging the candidate carrier frequencies associated with the at least $N_s$ second metrics in order of magnitude and selecting $N_f$ metrics, where $N_f \geq 1$, based on the largest magnitude second metrics; and selecting at least one of the $N_f$ candidate carrier frequencies for further processing.

16. The method of claim 11 wherein determining the first and second metrics is performed for a plurality of channel hypotheses associated with at least one of the plurality of candidate carrier frequencies.

17. The method of claim 13 wherein re-calculating the first and second metrics comprises:

re-calculating the first and second metrics based upon a power value based upon a maximum power value determined from a set of power measurements including the power measurement value of a first measurement time interval and the at least one additional power measurement.

18. A wireless device comprising:

a processor;

an adaptive measurement interval function configured to:

determine a first power value at a carrier frequency in respect of a first measurement time interval by determining at least one of a first and second metric for each of at least one channel hypotheses, each channel hypothesis having a hypothetical occupied portion and a hypothetical guard band portion, a first metric based on a power measurement and at least one additional power measurement of the hypothetical occupied portion and a second metric based on a difference between the power measurement and the at least one additional power measurement of the hypothetical occupied portion and a power measurement and at least one additional power measurement of the hypothetical guard band portion;

determine whether or not the first power value meets at least one criterion;

when the first power value does not meet the at least one criterion, determine at least one additional power value at the carrier frequency in respect of a second measurement time interval;

select at least one power value from a set of power values that have been determined, the set including the at least one additional power value, wherein selecting the at least one power value includes at least determining a maximum power value from the set of power values that have been determined;

determine a power value for the calculation of an RSSI metric for use in cell selection or cell re-selection based on the selected at least one power value.

* * * * *